United States Patent
Novin et al.

(10) Patent No.: US 7,278,341 B1
(45) Date of Patent: Oct. 9, 2007

(54) STRUCTURAL BOLT SECURITY APPARATUS

(75) Inventors: Hossein A. Novin, Overland Park, KS (US); J. Lawrence Louk, Overland Park, KS (US); Michael L. Owens, Kansas City, MO (US); Terrance Super, Overland Park, KS (US); Thomas Jones, Pleasant Hill, MO (US)

(73) Assignee: Selective Site Consultants, Inc., Overland Park, KS (US)

( * ) Notice: Subject to any disclaimer, the term of this patent is extended or adjusted under 35 U.S.C. 154(b) by 0 days.

(21) Appl. No.: 11/390,024

(22) Filed: Mar. 27, 2006

Related U.S. Application Data

(60) Provisional application No. 60/762,188, filed on Jan. 25, 2006, provisional application No. 60/718,288, filed on Sep. 19, 2005, provisional application No. 60/694,118, filed on Jun. 24, 2005.

(51) Int. Cl.
*B25B 13/06* (2006.01)
*F16B 37/14* (2006.01)
*F16B 31/00* (2006.01)

(52) U.S. Cl. ............... 81/121.1; 411/428; 411/910; 73/761

(58) Field of Classification Search ............... 81/121.1; 411/427, 428, 371.2, 910; 73/761
See application file for complete search history.

(56) References Cited

U.S. PATENT DOCUMENTS

| | | | |
|---|---|---|---|
| 1,447,564 A * | 3/1923 | Norlund et al. ............ 411/337 |
| 2,518,468 A * | 8/1950 | Harding ..................... 411/269 |
| 4,018,111 A * | 4/1977 | Goldhaber .................... 81/436 |
| 4,093,285 A * | 6/1978 | Fayle ........................ 292/251 |
| RE30,183 E * | 1/1980 | Popenoe ...................... 73/761 |
| 4,294,122 A * | 10/1981 | Couchman ................... 73/761 |
| 4,502,825 A * | 3/1985 | Yamada ......................... 411/5 |
| 4,602,511 A * | 7/1986 | Holt ........................... 73/581 |
| 4,621,230 A * | 11/1986 | Crouch et al. ............. 324/110 |
| 4,676,109 A * | 6/1987 | Wallace ....................... 73/761 |
| 4,726,723 A * | 2/1988 | Bainbridge ................. 411/432 |
| 4,730,470 A | 3/1988 | Zane et al. |
| 4,732,517 A * | 3/1988 | Crouch et al. ............... 411/39 |
| 4,734,001 A | 3/1988 | Bennett |
| 4,742,702 A * | 5/1988 | Swertz ........................ 70/231 |
| 4,754,628 A | 7/1988 | Siegel |
| 4,841,838 A * | 6/1989 | Scully et al. ............. 89/36.08 |
| 4,862,716 A | 9/1989 | Derman |
| 4,870,842 A | 10/1989 | Plumer |
| 4,898,429 A | 2/1990 | Plumer |
| 4,899,591 A * | 2/1990 | Kibblewhite ................ 73/761 |

(Continued)

*Primary Examiner*—David B. Thomas
(74) *Attorney, Agent, or Firm*—Lathrop & Gage LC

(57) ABSTRACT

A structural bolt security apparatus includes a security nut forming a threaded central hole for a bolt; the security nut has a groove in an upper surface and/or a side surface. At least one groove is at least partially separated from the threaded central hole by the upper surface. In one embodiment, a security nut has a plurality of electrical contacts, logic electronics configured for monitoring electrical resistance across the electrical contacts, and a transmitter for broadcasting security data generated by the logic electronics. In one embodiment, a structural bolt security apparatus includes a security nut and an outer sleeve. Structural bolt security systems described herein include a security nut, a security socket, and a security wrench. The systems may be equipped with RFID chips for recognition of matched security nuts and security sockets, and/or with GPS transceivers for broadcasting security wrench position information.

28 Claims, 16 Drawing Sheets

U.S. PATENT DOCUMENTS

| | | | |
|---|---|---|---|
| 4,906,150 A | | 3/1990 | Bennett |
| 4,938,108 A | | 7/1990 | Mekler |
| 4,953,374 A | | 9/1990 | Wiebe |
| 4,984,667 A | | 1/1991 | Tjaden |
| 5,056,870 A | | 10/1991 | Plumer |
| 5,071,300 A | * | 12/1991 | McCauley .................. 411/222 |
| 5,097,686 A | | 3/1992 | Plumer |
| 5,131,796 A | | 7/1992 | Herum et al. |
| 5,214,945 A | | 6/1993 | Martin |
| 5,220,839 A | * | 6/1993 | Kibblewhite ................. 73/761 |
| 5,337,587 A | | 8/1994 | Davidson |
| 5,370,486 A | | 12/1994 | Plummer |
| 5,391,033 A | | 2/1995 | Gibbons |
| 5,401,133 A | * | 3/1995 | Kuchler ..................... 411/402 |
| 5,461,923 A | * | 10/1995 | Meisterling ................. 73/761 |
| 5,469,726 A | | 11/1995 | Rushing et al. |
| 5,480,198 A | | 1/1996 | Wydler et al. |
| 5,520,034 A | | 5/1996 | Edmondson |
| 5,649,797 A | | 7/1997 | Warren et al. |
| 5,688,091 A | * | 11/1997 | McKinlay .................. 411/149 |
| 5,699,703 A | * | 12/1997 | Habele ....................... 81/57.38 |
| 5,727,590 A | | 3/1998 | Julicher et al. |
| 5,775,145 A | | 7/1998 | Kasper |
| 5,791,848 A | | 8/1998 | Lanham |
| 5,863,166 A | * | 1/1999 | Young ........................ 411/405 |
| 5,890,859 A | | 4/1999 | Hasnik |
| 5,898,379 A | * | 4/1999 | Vanbergeijk ................ 340/680 |
| 6,019,558 A | | 2/2000 | Warren et al. |
| 6,024,522 A | | 2/2000 | Bainbridge et al. |
| 6,039,524 A | | 3/2000 | McKinlay |
| 6,053,680 A | | 4/2000 | Menke |
| 6,070,442 A | | 6/2000 | Neeley et al. |
| 6,089,396 A | | 7/2000 | Pozek |
| 6,261,041 B1 | * | 7/2001 | Nakamura .................. 411/432 |
| 6,287,310 B1 | | 9/2001 | Fox |
| 6,322,158 B1 | | 11/2001 | Herrera |
| 6,341,455 B1 | | 1/2002 | Gunn |
| 6,341,927 B2 | | 1/2002 | Hampson et al. |
| 6,354,152 B1 | * | 3/2002 | Herlik ......................... 73/597 |
| 6,363,560 B1 | | 4/2002 | Kesinger |
| 6,494,658 B1 | * | 12/2002 | Roy ............................ 411/428 |
| 6,571,588 B1 | * | 6/2003 | Yuen ........................... 70/233 |
| 6,607,041 B2 | * | 8/2003 | Suzuki et al. ................. 173/4 |
| 6,609,401 B1 | * | 8/2003 | Iskhakbayev ................ 70/225 |
| 6,612,772 B1 | | 9/2003 | DeMarco et al. |
| D487,562 S | | 3/2004 | Campbell |
| 6,702,622 B2 | | 3/2004 | Sato |
| 6,732,615 B2 | | 5/2004 | Layaou |
| 6,807,880 B1 | | 10/2004 | Brian et al. |
| 6,843,153 B1 | * | 1/2005 | Rawson-Harris ............. 81/120 |
| 6,910,355 B2 | * | 6/2005 | Swanson ..................... 70/232 |
| 6,925,395 B2 | * | 8/2005 | Kadner ........................ 702/41 |
| 6,959,627 B2 | * | 11/2005 | Doran ........................ 81/121.1 |
| 6,990,866 B2 | * | 1/2006 | Kibblewhite ................. 73/761 |
| 7,004,701 B2 | * | 2/2006 | Ross ........................... 411/432 |
| 7,036,605 B2 | * | 5/2006 | Suzuki et al. ................. 173/20 |
| 2004/0073384 A1 | * | 4/2004 | Kadner ........................ 702/41 |
| 2004/0144552 A1 | * | 7/2004 | Suzuki et al. ................. 173/2 |
| 2005/0286980 A1 | | 12/2005 | Koppenhoefer |

* cited by examiner

STRUCTURAL BOLT SECURITY APPARATUS

RELATED APPLICATIONS

The present application claims benefit of priority to provisional U.S. Patent Application No. 60/694,118, filed Jun. 24, 2005 and titled "Structural Bolt Security Apparatus"; provisional U.S. Patent Application No. 06/718,288, filed Sep. 19, 2005 and titled "Structural Bolt Security Apparatus"; and provisional U.S. Patent Application No. 60/762,188, filed Jan. 25, 2006 and titled "Structural Bolt Security Apparatus" all of which are incorporated herein by reference.

BACKGROUND

Many structures such as, for example, electrical transmission towers, communication towers, aqueducts, pipeline structures, and water towers are important to public infrastructure, but traverse remote areas where direct observation for security is impractical. Some of these structures utilize fasteners such as standard bolts and nuts that may present accessible, attractive targets for vandals and/or terrorists.

SUMMARY

A structural bolt security apparatus is disclosed herein. The structural bolt security apparatus includes a security nut that forms a threaded central hole for engaging a bolt, and at least one groove that intersects an upper surface and/or a side surface of the nut. At least one groove is at least partially separated from the threaded central hole by the upper surface and configured according to a unique master pattern.

A structural bolt security system includes a security nut, a security socket, and a security wrench for turning the security socket. The security nut forms a threaded central hole for a bolt and defines a groove that intersects an upper surface and/or a side surface of the nut. The security nut also has an RFID chip. The security socket has an RFID chip and a protrusion for engaging the security nut groove. The security wrench comprises an RFID transceiver and logic electronics configured to disable the security wrench except in the presence of at least one of the RFID chips.

A structural bolt security apparatus includes a security nut having a plurality of electrical contacts and forming a threaded central hole for a bolt. The security nut has logic electronics configured for monitoring electrical resistance across the electrical contacts, and the security nut has a transmitter for broadcasting security data generated by the logic electronics.

A structural bolt security system includes a security nut and a security wrench. The security nut forms a threaded central hole for engaging a bolt, and the security nut forms a groove that intersects an upper surface and/or a side surface of the nut. The security wrench comprises 1) a security socket having a protrusion for engaging the security nut groove; and 2) a GPS transceiver for broadcasting security wrench position information.

A structural bolt security apparatus includes a security nut and an outer sleeve. The security nut defines a threaded central hole for engaging a bolt, and the security nut forms a groove that intersects an upper surface of the nut. The security nut has a bottom surface that defines a recess. The outer sleeve has a height greater than or about equal to a height of the security nut, and the outer sleeve has a flange with a height less than a height of the recess in the nut. The flange is disposed in the recess so that the outer sleeve rotates freely about the security nut.

DETAILED DESCRIPTION OF DRAWINGS

Figure 1:
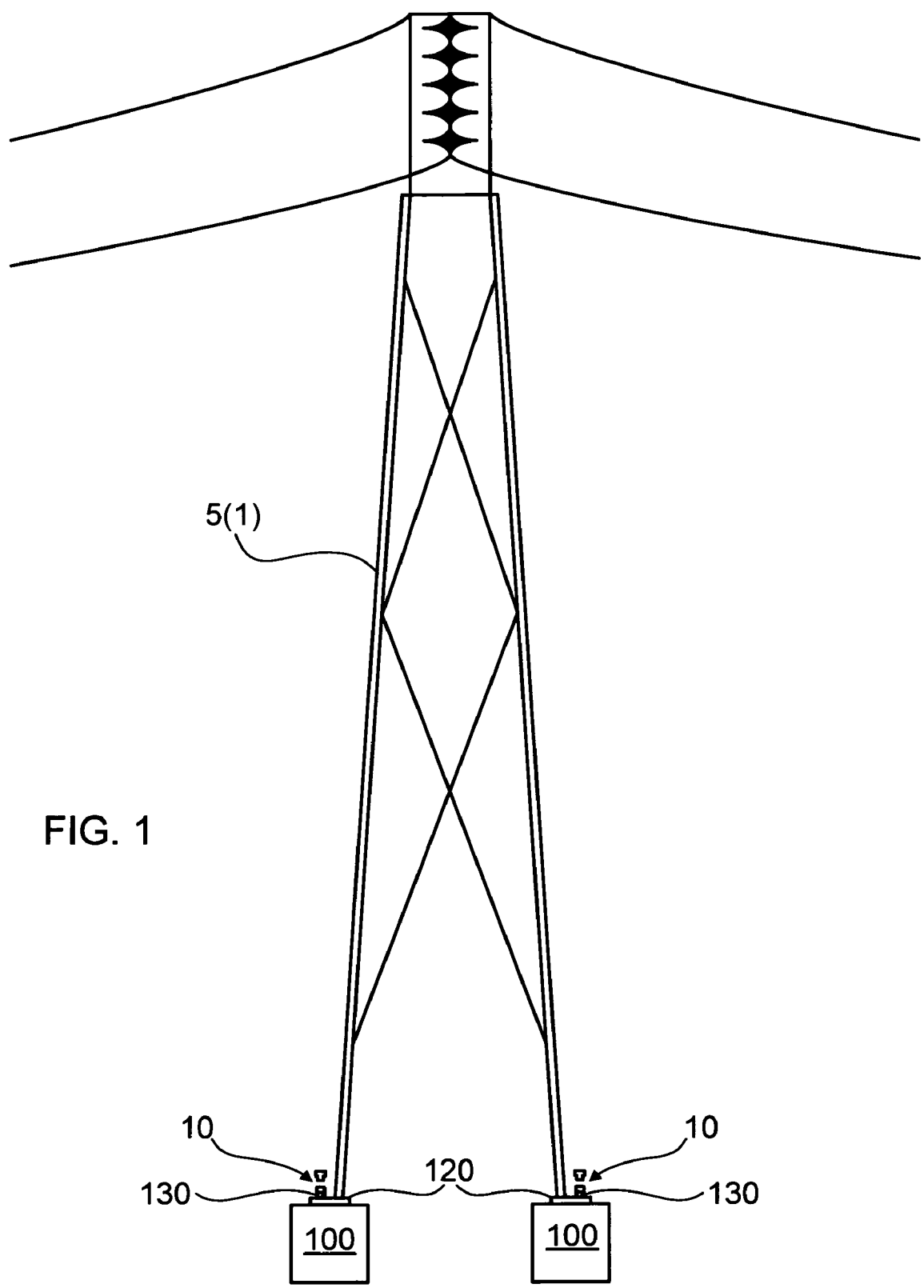
FIG. 1 shows structural bolt security apparatus in accord with an embodiment and as applied to a transmission tower.

FIG. 1 is a schematic diagram showing a structural bolt security apparatus 10 in operational use with a transmission tower 5(1). Transmission tower 5(1) has baseplates 120, and each baseplate 120 is bolted to a footing 100 using a nut 130 and structural bolt security apparatus 10.

FIG. 1 may not be drawn to scale. The number of baseplates shown in FIG. 1 is exemplary only; the use of structural bolt security apparatus 10 is not limited to structures (e.g., tower 5(1)) having any particular number of baseplates.

Figure 2A:
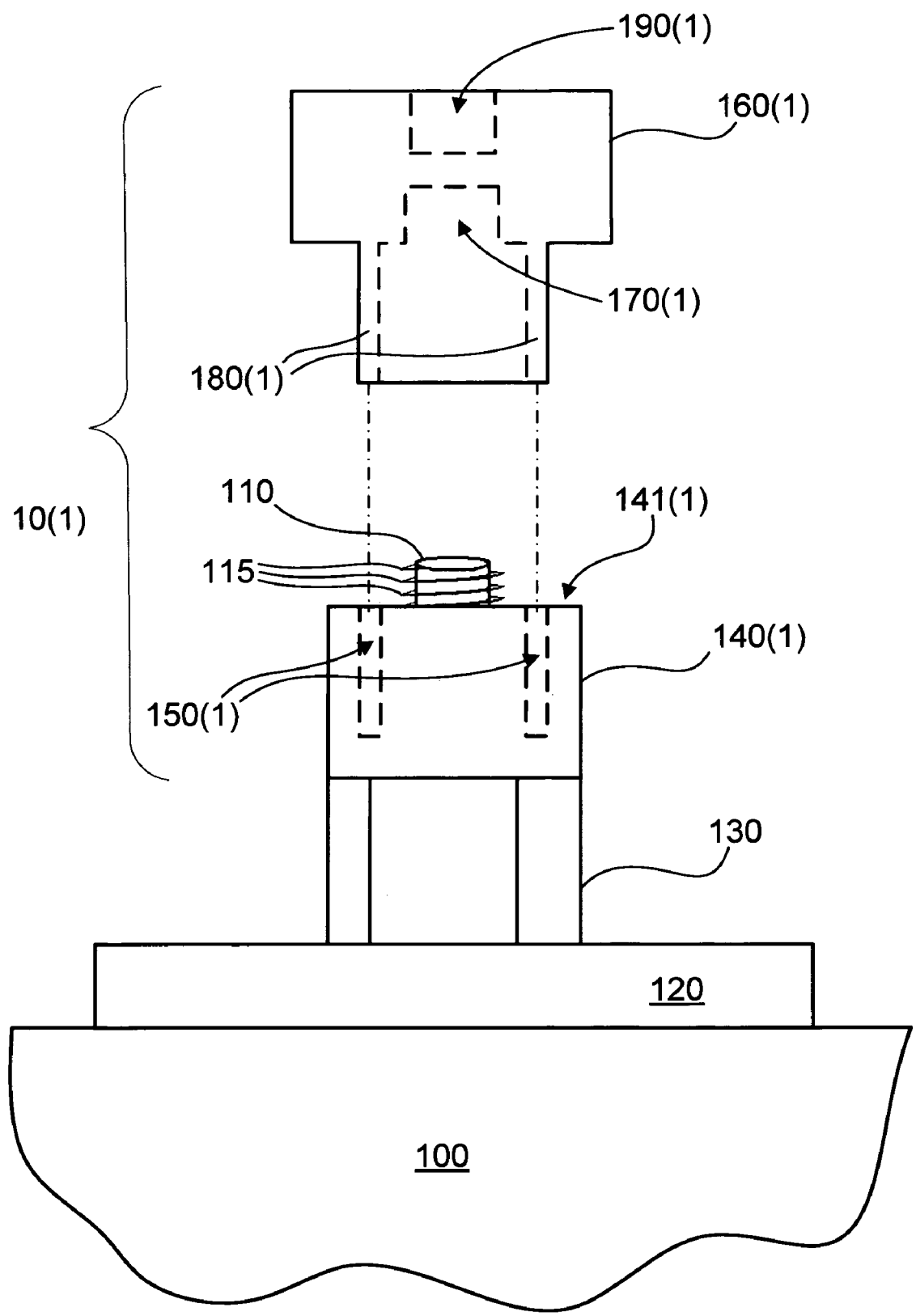
FIG. 2A shows structural bolt security apparatus in accord with an embodiment.

FIG. 2A is a side view showing a structural bolt security apparatus 10(1) securing nut 130 to a bolt 110. FIG. 2A may not be drawn to scale. Nut 130 includes threads (not shown) that engage standard threads 115 of bolt 110, and may attach a base plate 120 to footing 100. Structural bolt security apparatus 10(1) includes a security nut 140(1) and a security socket 160(1). Security socket 160(1) includes protrusions 180(1) about a recess 170(1); an upper surface 141(1) of security nut 140(1) has grooves 150(1) that mate with protrusions 180(1). As described below, the patterns of grooves 150(1) and protrusions 180(1) are chosen so that only socket 160(1) mates with security nut 140(1). Security socket 160(1) has a recess 190(1) that may engage with a drive element of a wrench (not shown).

The descriptions that follow may refer to specific examples of an item with numerals in parentheses (e.g., security nut 140(1)) while references intended to encompass all such items do not have numerals in parentheses (e.g., security nuts 140).

Figure 2B:
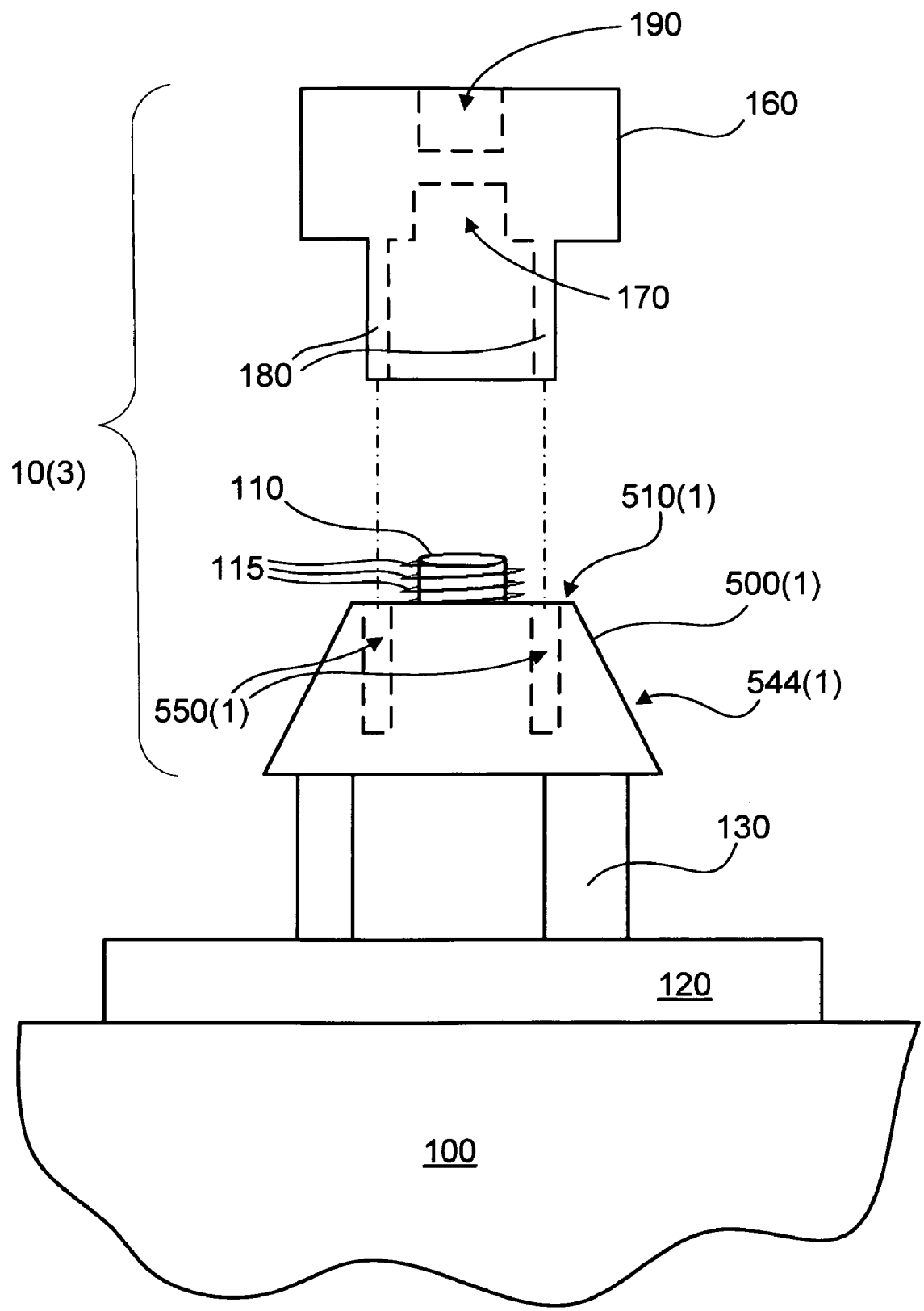
FIG. 2B shows structural bolt security apparatus in accord with an embodiment.

FIG. 2B is a side view showing a structural bolt security apparatus 10(3) securing a nut 130 to a bolt 110. FIG. 2B may not be drawn to scale. Each of nut 130, threads 115, bolt 110, base plate 120 and footing 100 are the same or similar as shown in FIG. 2A. Structural bolt security apparatus 10(3) includes a security nut 500(1) and security socket 160. Security socket 160 includes protrusions 180 about a recess 170; an upper surface 510(1) of security nut 500(1) has grooves 550(1) that mate with protrusions 180. As described below, the patterns of grooves 550(1) and protrusions 180 are chosen so that only socket 160 mates with security nut 500(1). Security nut 500(1) also forms a conical side surface 544(1), as shown. Conical side surface 544(1) impedes tools adapted for gripping objects with approximately vertical surfaces (tools such as, for example pliers or pipe wrenches), from gripping security nut 500(1). Thus, conical side surface 544(1) may deter unauthorized persons (e.g., those who do not have security socket 160) from turning security nut 500(1) to gain access to nut 130. Security socket 160 has a recess 190 that may engage with a drive element of a wrench (e.g., wrench 210, see FIG. 6A or FIG. 10).

Figure 3A:
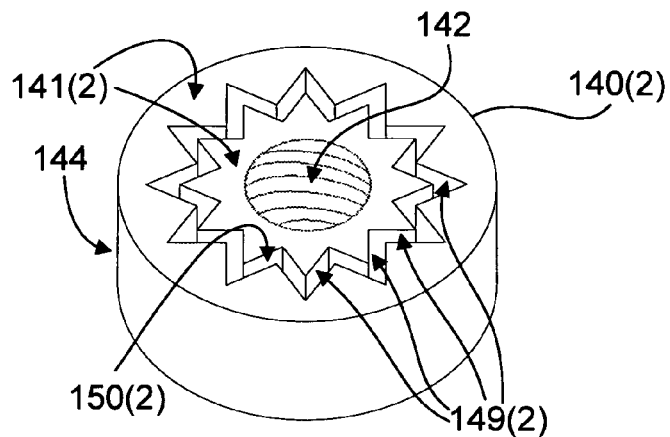
FIG. 3A shows a groove in a security nut, in accord with an embodiment.
Figure 3B:
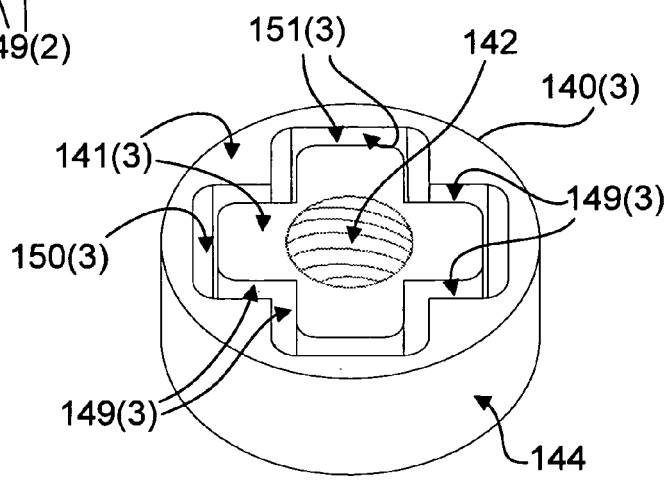
FIG. 3B shows a groove in a security nut, in accord with an embodiment.
Figure 3C:
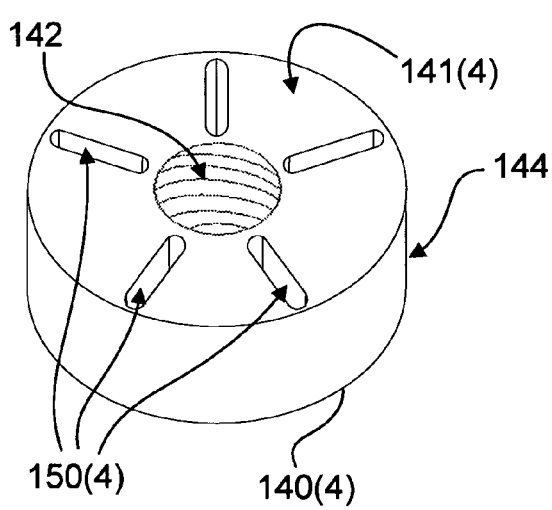
FIG. 3C shows a set of grooves in a security nut, in accord with an embodiment.
Figure 3D:
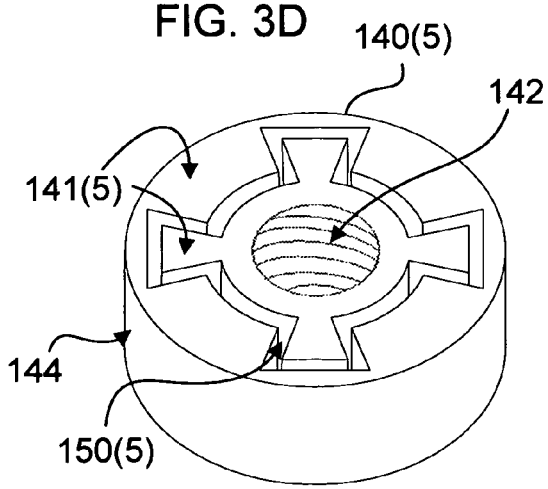
FIG. 3D shows a groove in a security nut, in accord with an embodiment.

FIG. 3A-FIG. 3D are perspective views that show representative grooves 150(2)-150(5) in upper surfaces 141(2)-141(5) of security nuts 140(2)-140(5), respectively. FIG. 3A-FIG. 3D may not be drawn to scale. Each of security nuts 140(2)-140(5) forms a central threaded hole 142 for a bolt (e.g., bolt 110 of FIG. 2A) and a cylindrical side surface 144 that is not easily turned by a tool such as a wrench or pliers. FIG. 3A, FIG. 3B and FIG. 3D show, respectively, grooves 150(2), 150(3) and 150(5) that encircle hole 142, while FIG. 3C shows a set of grooves 150(4) that are separate from one another and, collectively, encircle hole 142. Notably, grooves 150 are at least partially separated from threaded holes 142 by upper surfaces 141. In other words, in at least one location, each groove 150 does not extend to threaded hole 142. FIG. 3A-FIG. 3D show grooves 150 that are entirely separated from threaded hole 142 by upper surface 141; these grooves 150 do not extend to threaded holes 142 at all. Surfaces 149 and 151 are described below in connection with FIG. 4A and FIG. 4B.

Figure 3E:
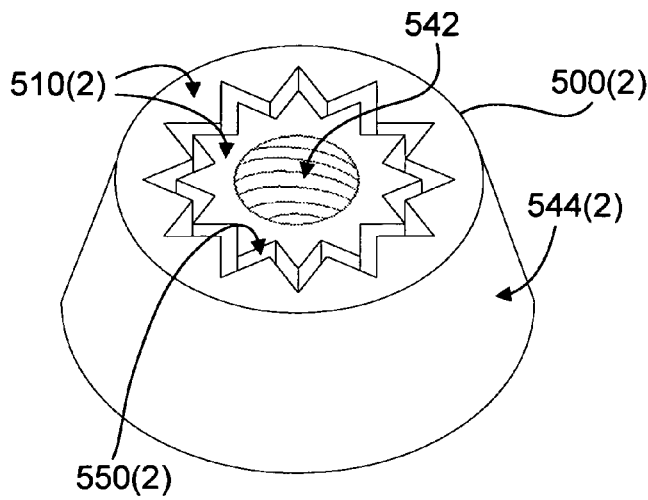
FIG. 3E shows a groove in a security nut, in accord with an embodiment.
Figure 3F:
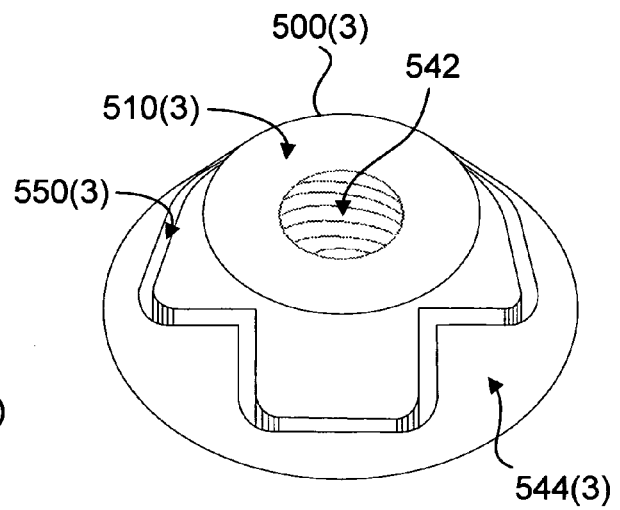
FIG. 3F shows a groove in a security nut, in accord with an embodiment.
Figure 3G:
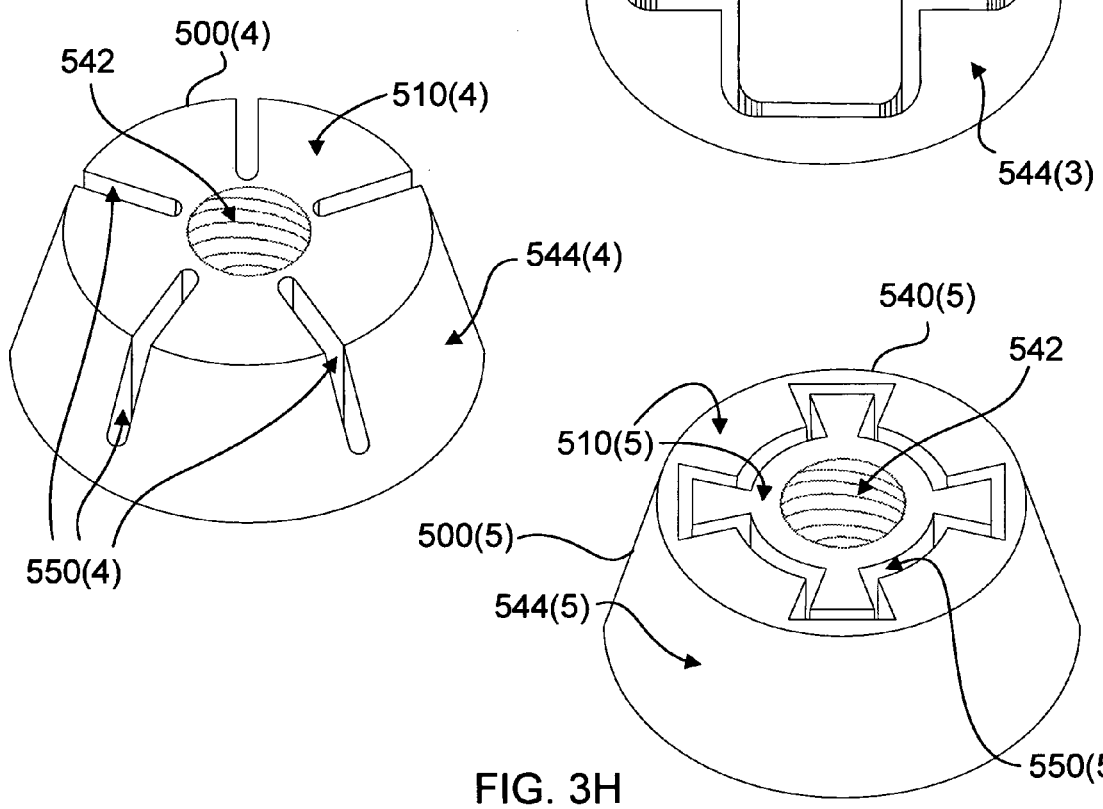
FIG. 3G shows a set of grooves in a security nut, in accord with an embodiment.
Figure 3H:
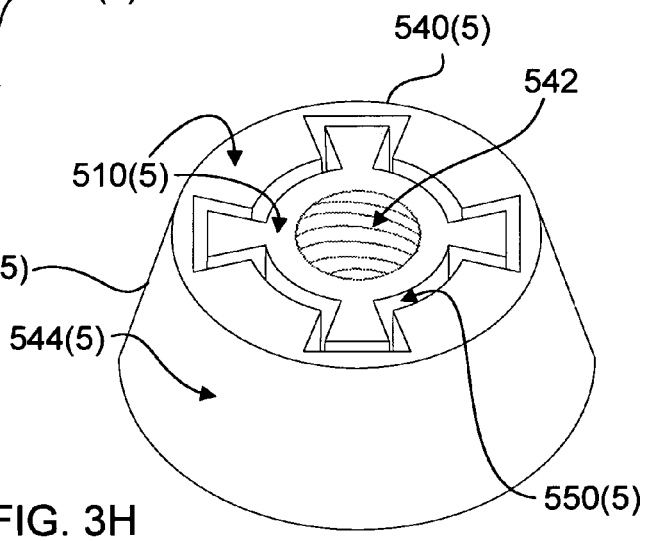
FIG. 3H shows a groove in a security nut, in accord with an embodiment.

FIG. 3E-FIG. 3H are perspective views that show representative grooves 550(2)-550(5) in upper surfaces 510(2)-510(5) and/or conical side surfaces 544(2)-544(5) of security nuts 500(2)-500(5), respectively. FIG. 3E-FIG. 3H may not be drawn to scale. Each of security nuts 500(2)-500(5) forms a central threaded hole 542 for a bolt (e.g., bolt 110 of FIG. 2B), and forms a conical side surface 544(2)-544(5) that is not easily gripped by a tool such as a pipe wrench or pliers. FIG. 3E, FIG. 3F and FIG. 3H show, respectively, grooves 550(2), 550(3) and 550(5) that form closed shapes about hole 542, while FIG. 3G shows a set of grooves 550(4) that are separate from one another and, collectively, encircle hole 542.

Grooves 550 may intersect an upper surface 510 and/or a conical side surface 544 of a security nut 500. For example, FIG. 3E and FIG. 3H show, respectively, grooves 550(2) and 550(5) that intersect upper surfaces 510(2) and 510(5) but that do not intersect conical side surfaces 544(2) and 544(5). FIG. 3F shows a groove 550(3) that intersects conical side surface 544(3) but does not intersect upper surface 510(3). FIG. 3G shows grooves 550(4) intersecting both upper surface 510(4) and conical side surface 544(4). Conical side surfaces 544 may also vary; for example, FIG. 3E, FIG. 3G and FIG. 3H show conical side surfaces 544(2), 544(4) and 544(5), respectively, that are relatively steep, while FIG. 3F shows a conical side surface 544(3) that has a more shallow slope.

A pattern for a groove (or set of grooves) 150 and corresponding protrusions 180 in a security socket are sometimes denoted a "master pattern" herein. At least portions of a master pattern generate surfaces that protrusions 180 may work against in order to turn a security nut 140; such surfaces are sometimes denoted "purchase surfaces" herein. Other portions of a master pattern may not provide purchase surfaces (i.e., portions of a master pattern that present surfaces that are approximately tangential to the direction in which a security nut turns will not present useful surfaces for protrusions 180 to work against). It will be appreciated that a security socket 160 may apply torque symmetrically to a security nut 140 when purchase surfaces of a master pattern are symmetric about central hole 142.

Figure 4A:
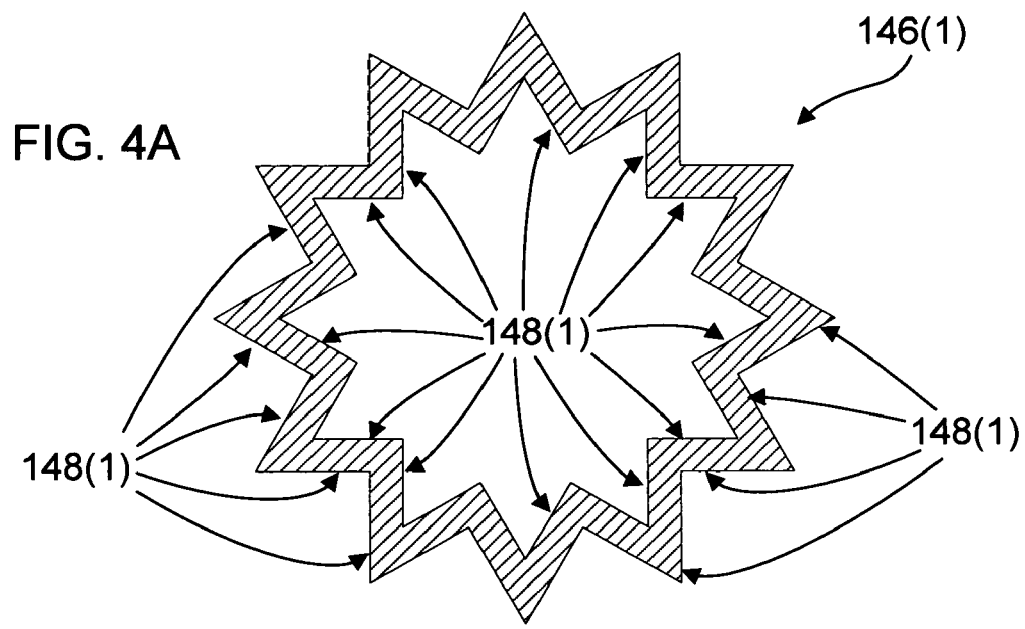
FIG. 4A shows a master pattern that corresponds to the groove of the security nut of FIG. 3A.

FIG. 4A illustrates a master pattern 146(1) of protrusions 180 that corresponds to a pattern of groove 150(2) of security nut 140(2) shown in FIG. 3A. Edges 148(1) of master pattern 146(1) correspond to purchase surfaces 149(2) on sides of groove 150(2) in security nut 140(2) (see FIG. 3A). That is, edges 148(1) correspond to surfaces 149(2) against which protrusions 180 of a security socket may work in order to turn security nut 140(2). Only some surfaces 149(2) are labeled in FIG. 3A, and only some edges 148(1) are labeled in FIG. 4A, for clarity of illustration.

Figure 4B:
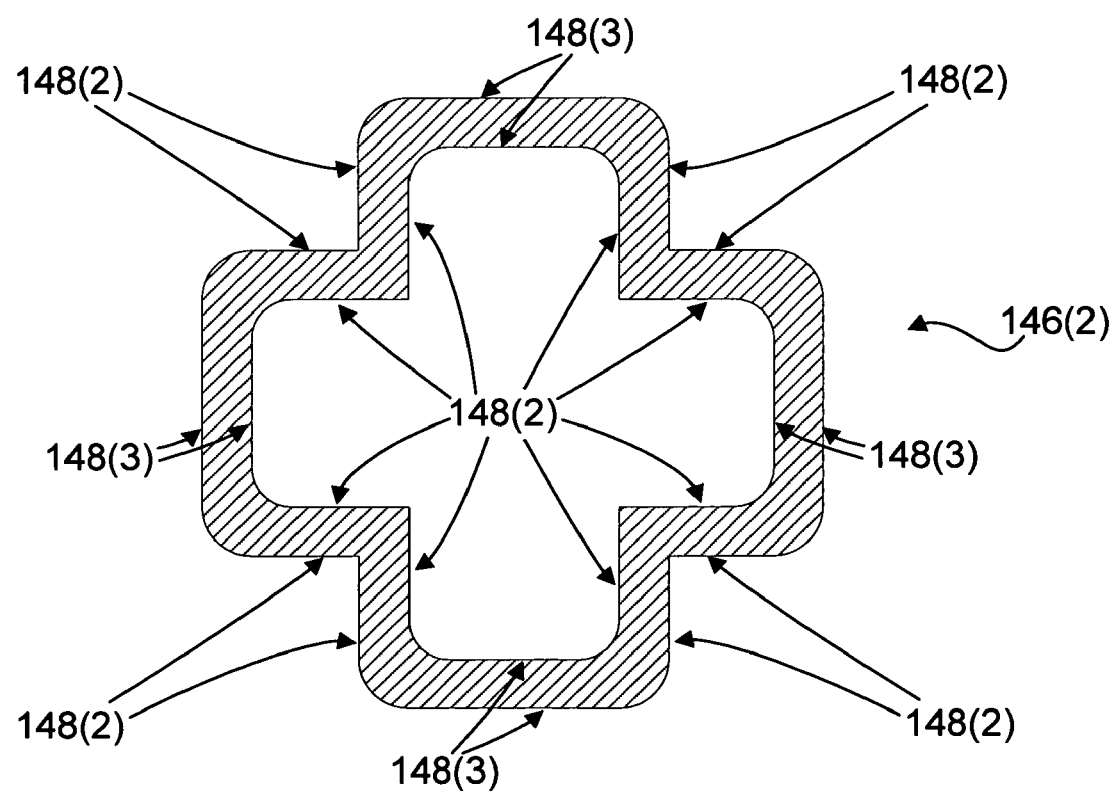
FIG. 4B shows a master pattern that corresponds to the groove of the security nut of FIG. 3B.

FIG. 4B illustrates a master pattern 146(2) of protrusions 180 that corresponds to a pattern of groove 150(3) of security nut 140(3) shown in FIG. 3B. Edges 148(2) of master pattern 146(2) correspond to purchase surfaces 149(3) on sides of groove 150(3) in security nut 140(3) (see FIG. 3B). Edges 148(3) of master pattern 146(2) correspond to non-purchase surfaces 151(3) in groove 150(3); that is, surfaces 151(3) are approximately tangential to the direction in which security nut 140(3) turns, so that protrusions 180 of a security socket exert relatively little force thereon. Only some surfaces 149(3) and 151(3) are labeled in FIG. 3B, and only some edges 148(2) and 148(3) are labeled in FIG. 4B, for clarity of illustration.

Security nuts 140 and security sockets 160 may also include keying elements in grooves 150 and protrusions 180, respectively. The use of keying elements may allow a large number of structural bolt security apparatuses to utilize a single master pattern, but only a security socket 160 with specific keying elements can engage a security nut 140 that has corresponding specific keying elements. It should be understood that a unique master pattern may be used for one security nut 140 or a single set of security nuts 140 so that another socket (i.e., a socket not meant to remove nut 140) cannot remove or tamper with the unique security nut(s) 140.

Figure 5:
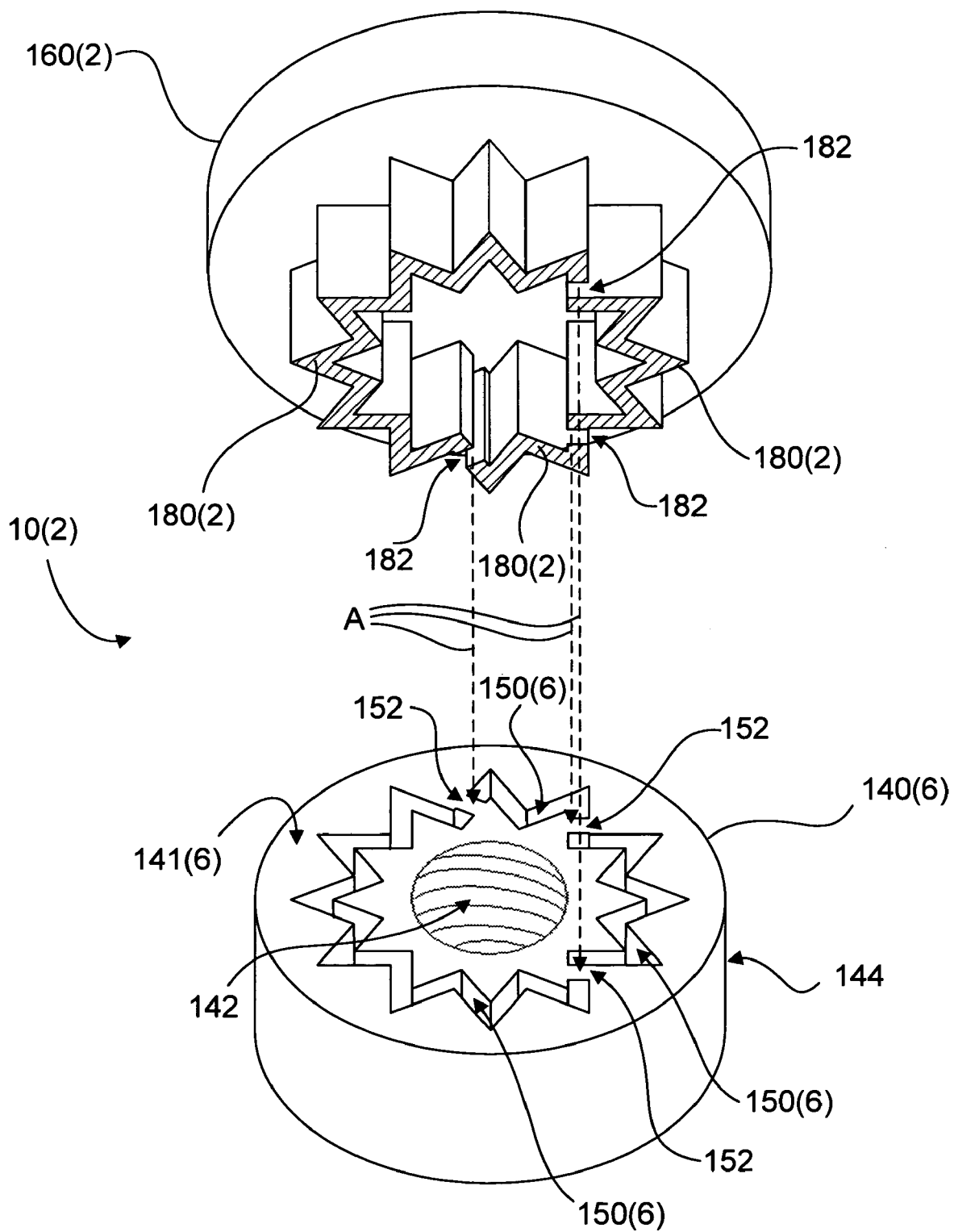
FIG. 5 shows structural bolt security apparatus with a security nut and a security socket, in accord with an embodiment.

FIG. 5 illustrates a structural bolt security apparatus 10(2) that has a security nut 140(6) and a security socket 160(2). An upper surface 141(6) of security nut 140(6) is shown, while security socket 160(2) is viewed from the underside (e.g., the side of security socket 160(2) that mates with security nut 140(6) is shown, with the bottom surface of protrusions 180(2) hatched for clarity of illustration). Grooves 150(6) in upper surface 141(6) of security nut 140(6) have master pattern 146(1) of FIG. 4A; however, security nut 140(6) is interrupted by three nut key elements 152 (e.g., metal forming security nut 140(6) exists at each nut key element 152). Protrusions 180(2) of security socket 160(2) also have master pattern 146(1) of FIG. 4A; however, protrusions 180(2) are interrupted by three socket key elements 182 (i.e., protrusions 180(2) have notches at each socket key element 182). As will be appreciated, a security socket with the master pattern of security nut 140(2) cannot engage with security nut 140(6) because the metal at nut key elements 152 would block protrusions of the security socket; however, security socket 160(2) can engage security nut 140(6) because each socket key element 182 is configured to accept a corresponding nut key element 152, as indicated by dashed arrows A in FIG. 5.

In addition to the utilization of grooves 150 for security, security nuts 140 act as locking devices, as required by certain structural codes.

Figure 6A:
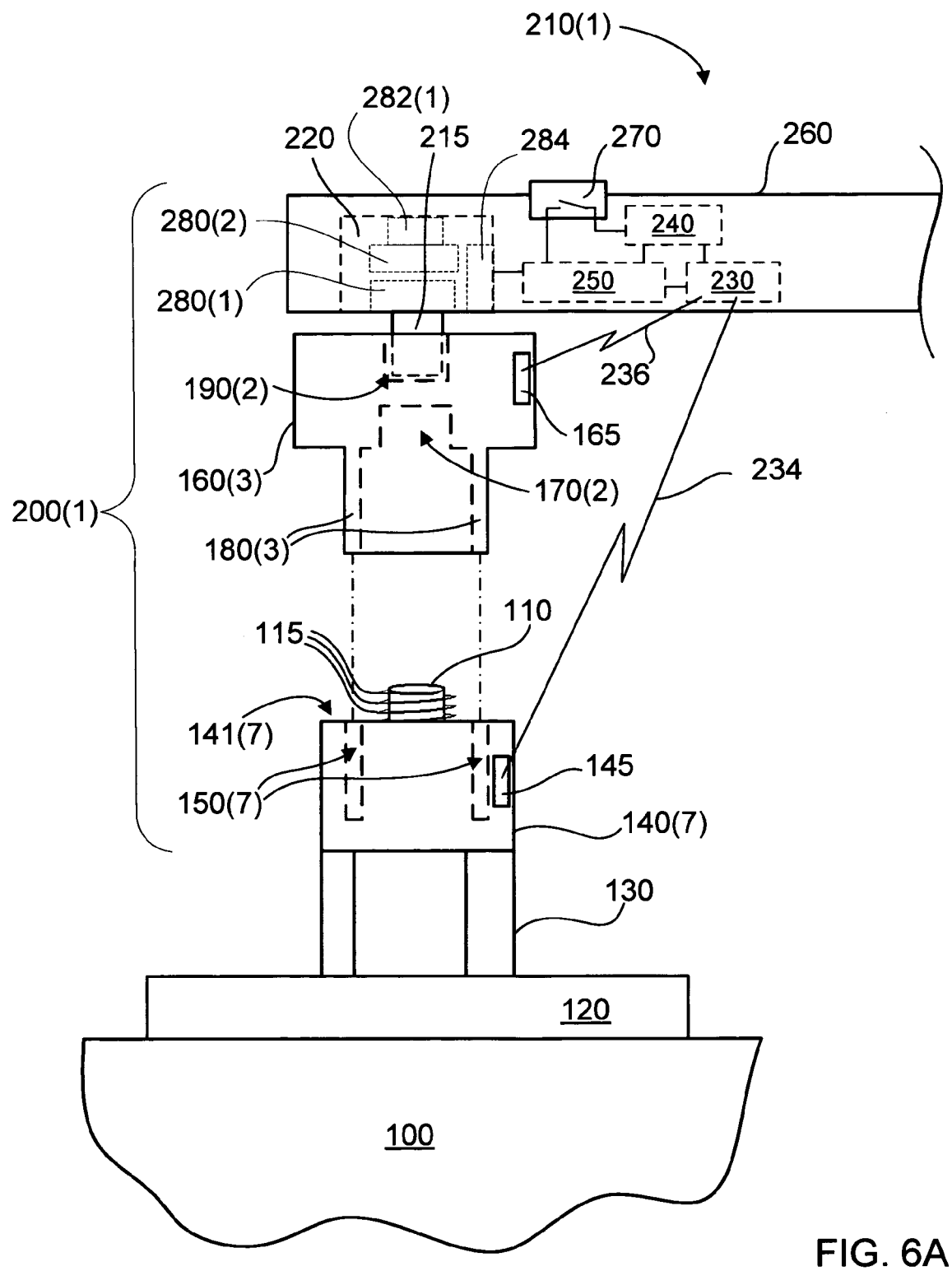
FIG. 6A shows structural bolt security apparatus securing a nut to a bolt, in accord with an embodiment.

FIG. 6A is a schematic side view showing structural bolt security system 200(1) securing nut 130 to bolt 110. FIG. 6A may not be drawn to scale. As in FIG. 2A and FIG. 2B, nut 130 (e.g., a standard nut) includes threads (not shown) that engage standard threads 115 of bolt 110, attaching base plate 120 (e.g., a base of an electrical transmission tower) to footing 100. Structural bolt security system 200(1) includes a security nut 140(7), a security socket 160(3) and a security wrench 210(1). Security socket 160(3) includes protrusions 180(3) about a recess 170(2); upper surface 141(7) of security nut 140(7) includes grooves 150(7) that mate with protrusions 180(3). The patterns of grooves 150(7) and protrusions 180(3) are chosen so that only socket 160(3) mates with security nut 140(7).

Security nut 140(7) and security socket 160(3) may contain radio frequency identification ("RFID") chips 145 and 165, respectively, such as shown. RFID chips 145 and 165 contain unique security codes, such that each individual security nut 140 or security socket 160 containing such a chip has an individual security code associated therewith, as discussed in more detail below. Security wrench 210(1) includes an RFID transceiver 230, a power source 240 (e.g., a battery), logic electronics 250, and a switch 270. Security wrench 210(1) also includes a drive element 215 which couples to a wrench handle 260 through an actuator 220. Actuator 220 includes an upper gear 280(2) and a lower gear 280(1). A central shaft 282(1) of upper gear 280(2) is attached to wrench handle 260 so that upper gear 280(2) is fixed and will turn when wrench handle 260 is turned. Lower gear 280(1) includes drive element 215 that may engage recess 190(2) of security socket 160(3), as shown.

Figure 6B:
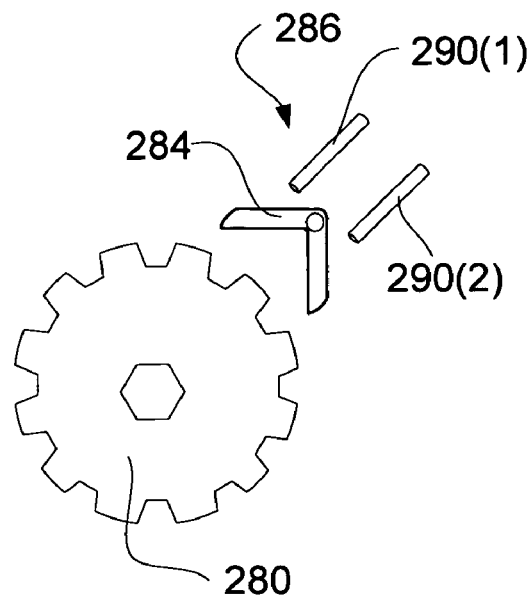
FIG. 6B shows exemplary detail of an actuator within a security wrench, in accord with an embodiment.
Figure 6C:
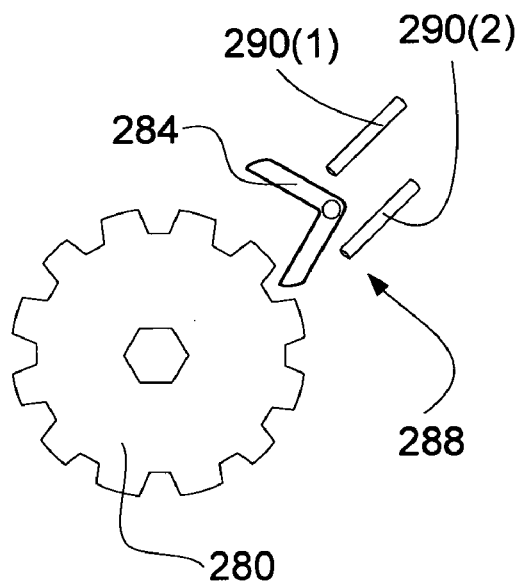
FIG. 6C shows exemplary detail of an actuator within a security wrench, in accord with an embodiment.
Figure 6D:
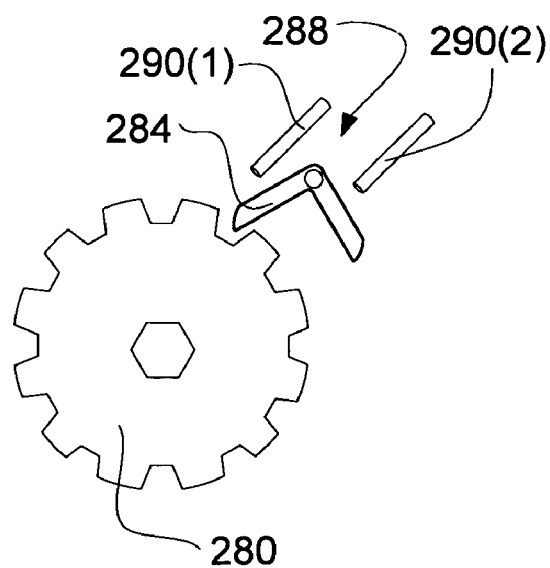
FIG. 6D shows exemplary detail of an actuator within a security wrench, in accord with an embodiment.

FIGS. 6B through 6D illustrate exemplary detail of actuator 220 of security wrench 210(1). FIGS. 6B through 6D may not be drawn to scale. A gear interlocker 284 couples upper gear 280(2) and lower gear 280(1) by restraining the movement of one gear 280(1), 280(2) when security wrench 210(1) is enabled (FIGS. 6C and 6D), but interlocker 284 allows gears 280(1), 280(2) to remain in a neutral position 286 (FIG. 6B) when security wrench 210(1) is disabled. In the disabled state shown in FIG. 6B, lower gear 280(1) rotates freely and cannot apply torque to security socket 160(3). In the enabled position 288 shown in FIGS. 6C and 6D, gear interlocker 284 blocks the free rotation of lower gear 280(1) by linking its movement to fixed upper gear 280(2). In some configurations, upper gear 280(2) may be replaced by an internal component (not shown) of security wrench handle 260 that engages gear interlocker 284. Depending on the enabled orientation of gear interlocker 284, rotation in one direction is blocked, thus providing torque in that direction, while allowing the gears to slip or freely rotate in the opposite direction.

Actuator 220 enables and disables rotation of a gear interlocker 284, and thus drive element 215, under the control of logic electronics 250. A default state of logic electronics 250 is such that actuator 220 allows drive element 215 to turn freely by orienting gear interlocker 284 in neutral position 286; this state is denoted herein as a "disabled" state of security wrench 210(1). For example, logic electronics 250 are configured such that security wrench 210(1) is in the disabled state when switch 270 is turned off, disconnecting power source 240. When switch 270 is turned on, RFID transceiver 230 broadcasts a radio frequency ("RF") signal (not shown); when the RF signal is in the presence of RFID chips 145 and/or 165, the RFID chips power up (using power from the RF signal, for example) and broadcast RF return signals 234 and 236, respectively. RF return signals 234 and 236 include the security code that is unique to RFID chips 145 and 165, respectively. Therefore, RFID transceiver 230 may use RF return signals 234 and 236 to positively identify the presence of RFID chips 145 and/or 165 and the security nut 140(7) and/or security socket 160(3) associated therewith. RFID transceiver 230 communicates information about the presence of RFID chips 145 and/or 165 to logic electronics 250, which, in turn, selectively enables actuator 220 (i.e., actuator 220 disables free rotation of drive element 215) based on the information. Enabling actuator 220 (e.g., enabling a user to turn drive element 215 with wrench handle 260) is denoted herein as an "enabled" state of security wrench 210(1). For example, security wrench 210(1) may be enabled when switch 270 is closed and power is supplied to drive a pin 290(1), 290(2) that orients gear interlocker 284. A switch (not shown) may allow a user to selectively route power to pin 290(1) or 290(2) such that the direction of torque may be toggled and determined by the user.

Variations of the mechanisms and electronics of security system 200(1) are within the scope of this disclosure. For example, logic electronics 250 may be configured to require the presence of security nut 140(7), security socket 160(3) or both, to enable security wrench 210(1). Furthermore, logic electronics 250 may compare information provided by RFID transceiver 230 about security nut 140(7) and security socket 160(3), and may enable security wrench 210(1) only when specific combinations of security nut 140(7) and security socket 160(3) are present. Logic electronics 250 and RFID transceiver 230 may be physically separate, as shown in FIG. 6A, or they may be integrated into a single chip. Recess 190(2) and drive element 215 may have unique patterns (e.g., like the unique configurations of grooves 150 and protrusions 180 of security nuts 140 and security sockets 160, respectively) to mitigate against the possibility of an unauthorized user utilizing security socket 160(3) with a wrench other than wrench 210(1).

Figure 7:
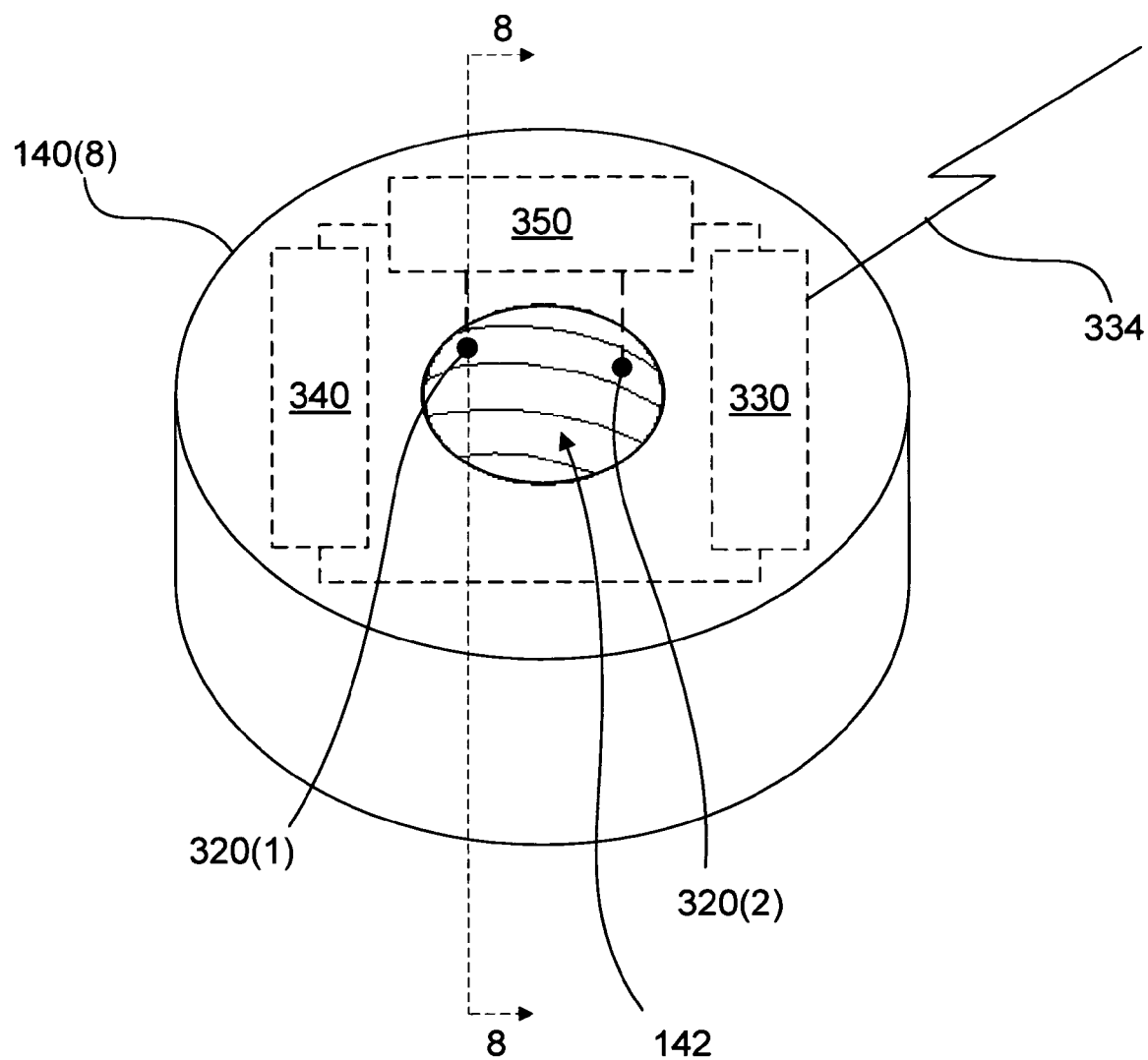
FIG. 7 shows a security nut, in accord with an embodiment.

FIG. 7 schematically illustrates a security nut 140(8). Security nut 140(8) includes a transmitter 330, a power source 340 (e.g., a battery), sensing and logic electronics 350, and connections thereamong, as shown. FIG. 7 may not be drawn to scale. Electronics 350 monitors electrical resistance across contacts 320(1) and 320(2) that are located on threads of a central threaded hole 142 of nut 140(8); electronics 350 also sends security data to transmitter 330 that corresponds to the resistance. The security data sent by electronics 350 may be analog or digital, and may represent a resistance value and/or an alarm state (e.g., a data value corresponding to states such as "no alarm," "warning 1," "warning 2" and "alarm"). Transmitter 330 broadcasts the security data from electronics 350 as an RF signal 334. Resistance measurements performed by electronics 350, and broadcast of RF signal 334 may be continuous or intermittent (e.g., they may occur at intervals ranging from once per second to once per month, with longer intervals reducing power consumption and extending a useful life of power source 340 accordingly). Security nut 140(8) may have features similar to security nuts 140(1)-140(7) described herein (e.g., grooves 150, with or without keying features 152, that correspond to protrusions 180 of a security socket 160). Dashed line 8-8 indicates a cross-sectional plane of security nut 140(8) that is shown in FIG. 8A and FIG. 8B.

Figure 8A:
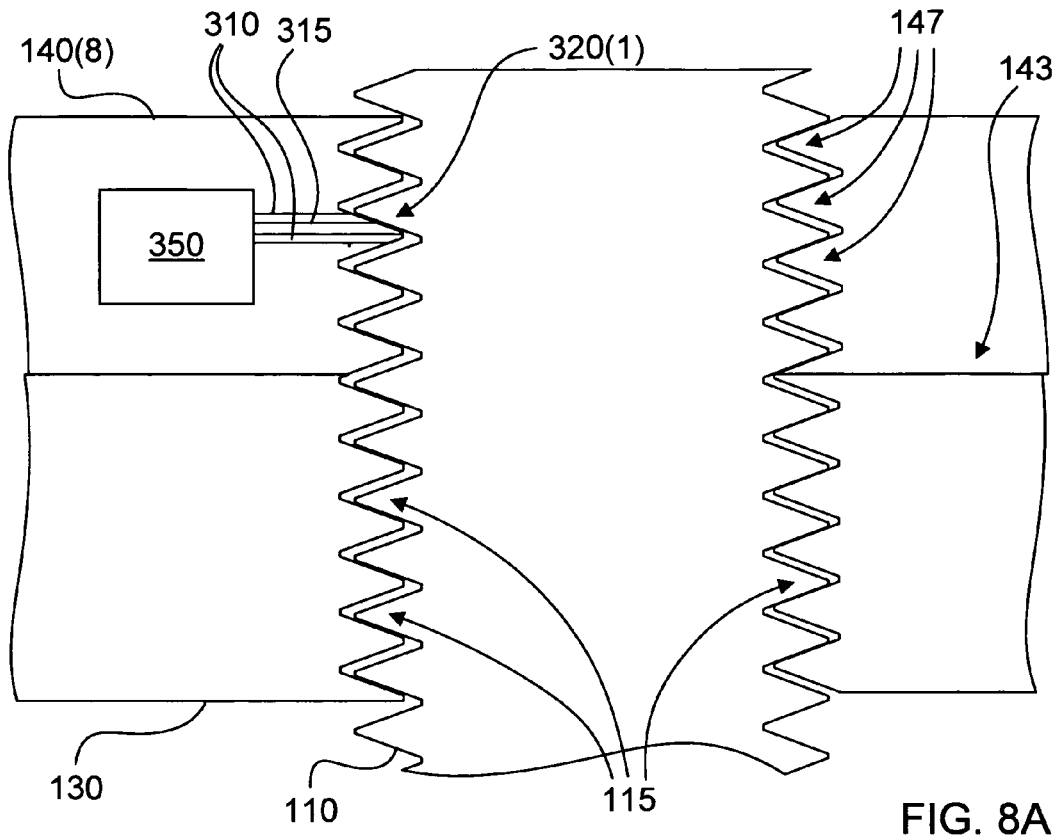
FIG. 8A shows a cross-section of a portion of the security nut of FIG. 7 threaded onto a bolt and tightened against a standard nut.

FIG. 8A is a schematic cross-sectional view of a portion of security nut 140(8) threaded onto a bolt 110 and tightened against a standard nut 130. FIG. 8A and FIG. 8B illustrate how tightness of security nut 140(8) against an underlying nut or structure may affect resistance across contacts 320(1) and 320(2). FIG. 8A may not be drawn to scale. The cross-section of FIG. 8A shows electronics 350 connected with a wire 315 that is surrounded by an insulator 310; contact 320(1) forms where wire 315 ends at a thread 147 of nut 140(8). As nut 140(8) threads onto bolt 110, a bottom surface 143 of nut 140(8) touches nut 130, but nut 140(8) can continue to move until lower surfaces of threads 115 of bolt 110 restrain upper surfaces of threads 147 of nut 140(8), as shown. Thus, contacts 320 (e.g., either of contacts 320(1) and 320(2)) may touch threads 115 of bolt 110 when contacts 320 are in an upper surface of threads 147. Electrical resistance between two contacts 320 that both touch bolt 110 may be low. Low resistance between contacts situated in upper surfaces of threads of a security nut 140(8), as illustrated in FIG. 8A, may also occur when nut 140(8) is tightened against surfaces other than a standard nut 130; for example, it may occur when nut 140(8) is tightened against an object such as a washer, a lock washer, or a baseplate.

Figure 8B:
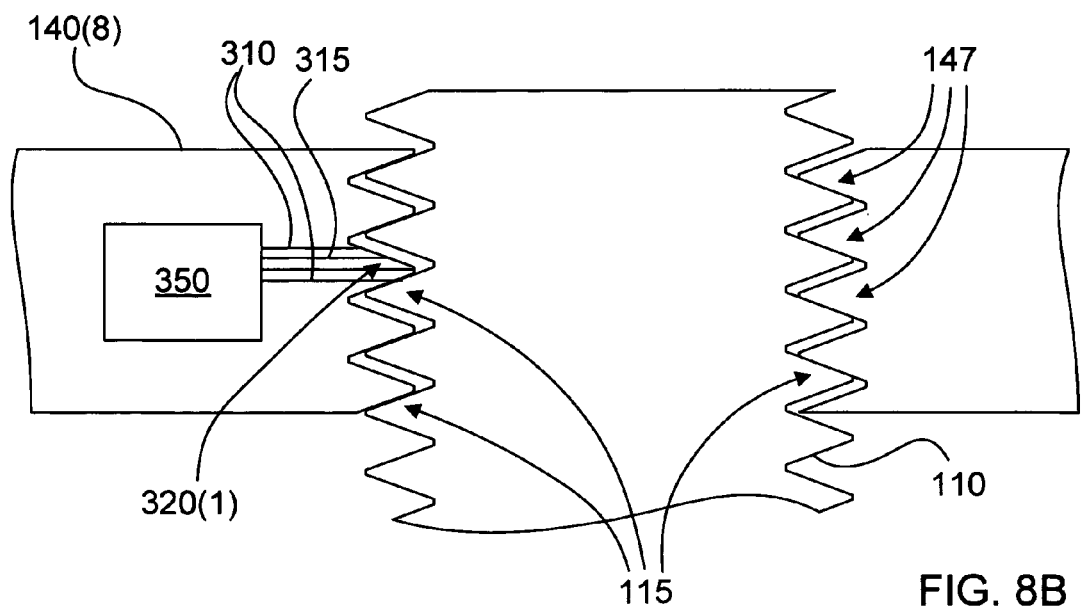
FIG. 8B shows a cross-section of a portion of the security nut of FIG. 7 loosely threaded onto a bolt.

FIG. 8B is a schematic cross-sectional view of a portion of security nut 140(8) loosely threaded onto bolt 110. FIG. 8B may not be drawn to scale. When nut 140(8) is not supported by an underlying object (e.g., such as nut 130, FIG. 8A), gravity acts to pull nut 140(8) downward such that lower surfaces of threads 147 rest on upper surfaces of threads 115. In the position shown in FIG. 8B, contact 320(1) does not contact bolt 110; therefore electrical resistance between two such contacts may be high. An intermediate resistance may exist in cases where one or both contacts 320 are in marginal mechanical contact with bolt 110, or where rust, dirt, water or other foreign substances exist between a contact 320 and bolt 110.

It is appreciated that electrical contacts may be formed in lower surfaces of threads 147, and electrical resistance interpreted in a manner opposite to that discussed above. That is, high electrical resistance may correspond with a nut that is tightened against an underlying object, and low electrical resistance may correspond with a nut that is supported by threads of a bolt.

Figure 9:
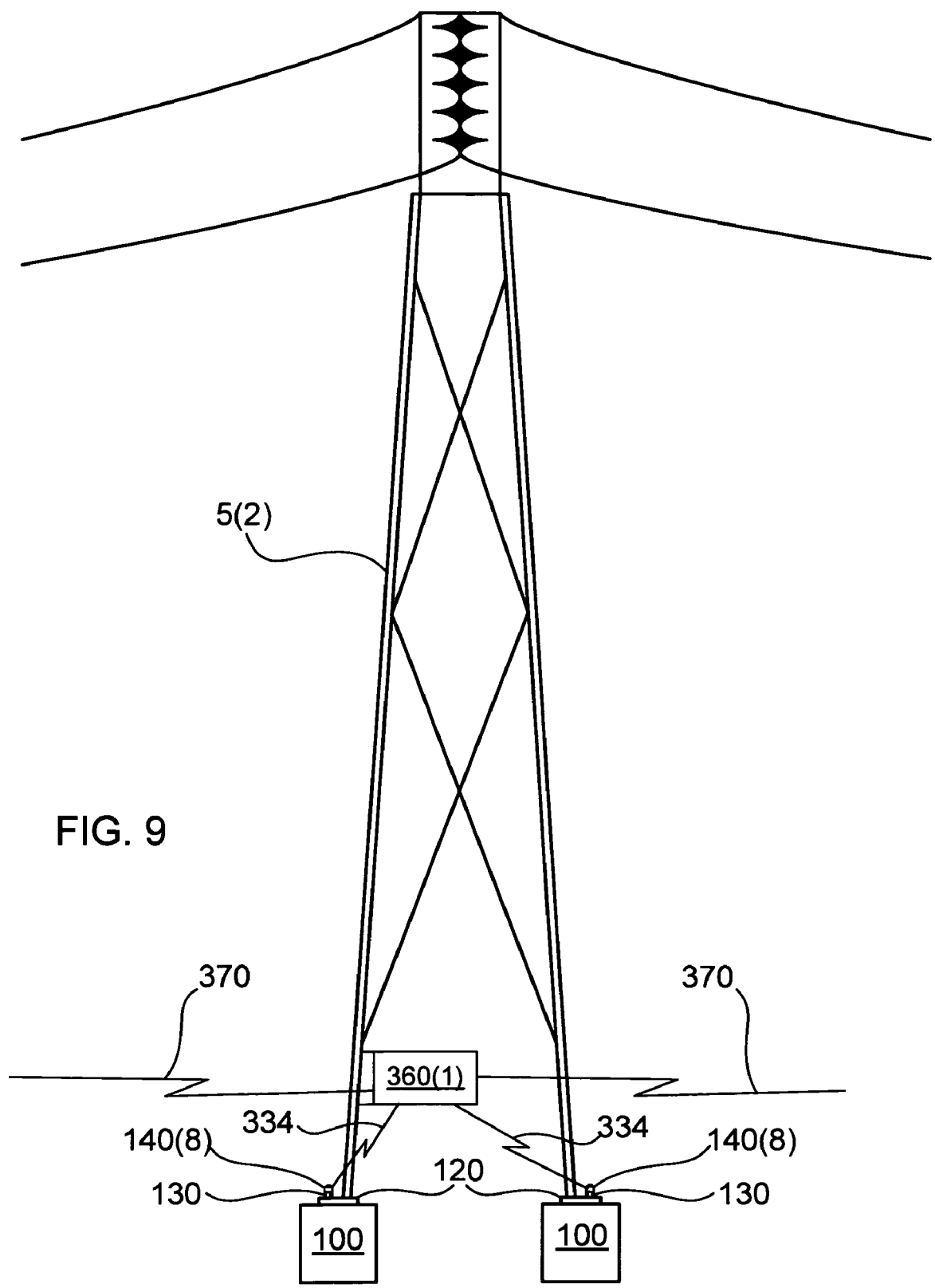
FIG. 9 illustratively shows a transmission tower bolted to footings using standard nuts and the security nuts of FIG. 7.

FIG. 9 is a schematic diagram showing a transmission tower 5(2) having baseplates 120 bolted to footings 100 using standard nuts 130 and security nuts 140(8). FIG. 9 may not be drawn to scale. Transmission tower 5(2) includes relay electronics 360(1) that receive RF signals 334 from security nuts 140(8); relay electronics 360(1) is configured to transmit and receive RF signals 370 to and from other relay electronics of other transmission towers, for example. Each relay electronics 360 may, for example, relay security data from security nuts 140(8), adding information identifying the structure or location at which the security data originated, as well as relaying information received from other relay electronics 360. A set of relay electronics 360 may thus form a security data relay chain, relaying security data to a security center where the security data can be displayed to security personnel, uploaded to a network, and/or stored for future use.

Figure 10:
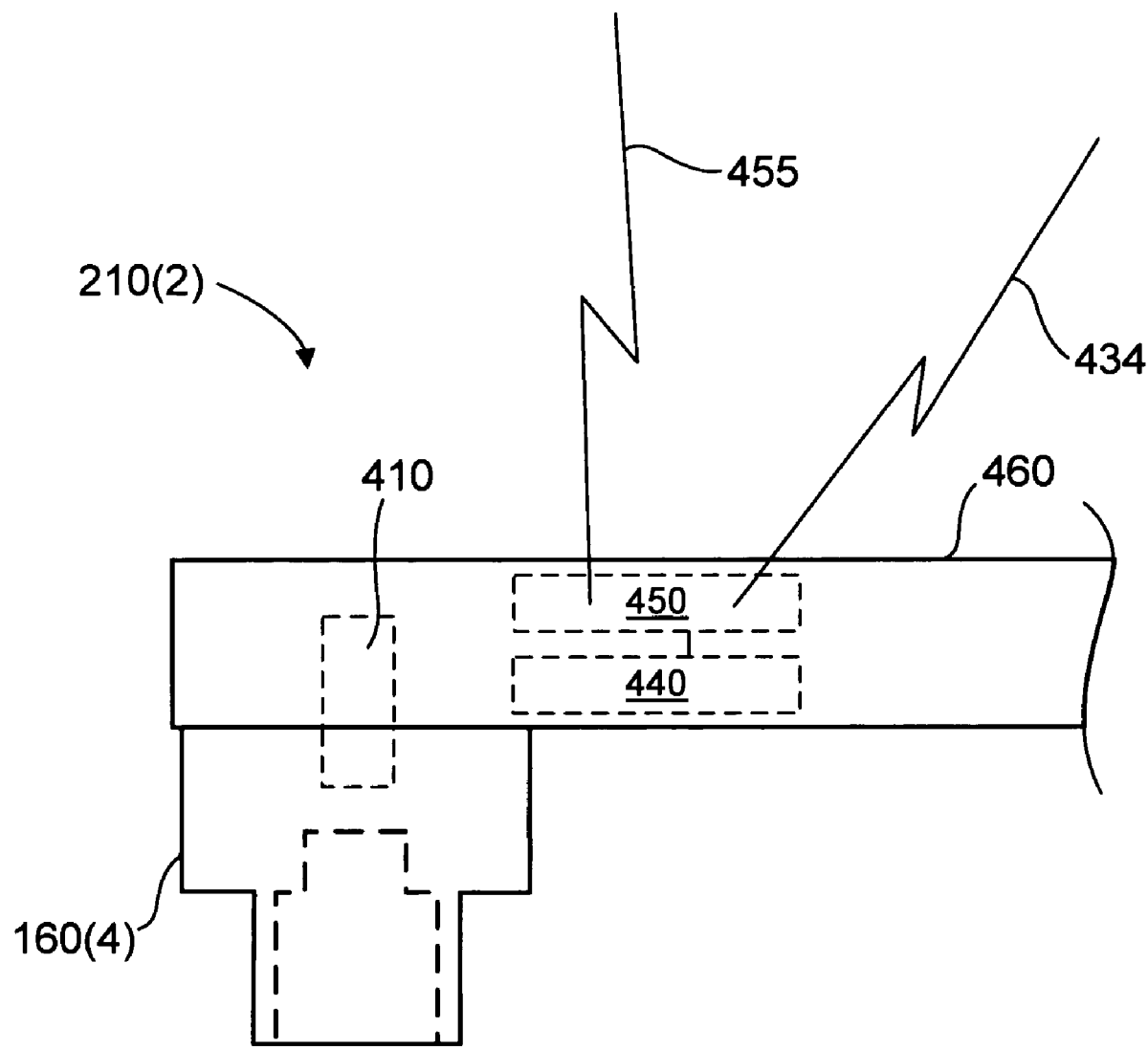
FIG. 10 shows a security wrench with Global Positioning System ("GPS") transceiver capability, in accord with an embodiment.

FIG. 10 is a schematic diagram illustrating a security wrench 210(2) that has Global Positioning System ("GPS") transceiver capability. FIG. 10 may not be drawn to scale. Security wrench 210(2) includes a GPS transceiver 450, a power source 440 (e.g., a battery), and a security socket 160(4). Security socket 160(4) may couple to security wrench 210(2) with a fixed coupler 410, as shown, or it may couple with an actuator (e.g., actuator 220 described above in relation to FIGS. 6A through 6D). GPS transceiver 450 receives GPS signals 455, decodes signals 455 to determine a position of security wrench 210(2), and broadcasts RF signals 434 that include position information of wrench 210(2). RF signals 434 may be used, for example, to track movement of wrench 210(2) in case of theft or mistrust of an person using wrench 210(2). RF signals 434 may be received by a portable tracking system (not shown) or by relay electronics (e.g., relay electronics 360 discussed above) that can relay position information along a security data relay chain to a security center.

It is appreciated that security nuts 140 keyed to security sockets 160, resistance measurements to monitor nut presence and/or tightness, nuts 140 and wrenches 210 with RFID chips and transceivers, relay electronics 360, and GPS transceivers may be used in combinations besides the combinations listed herein. For example, in certain applications it may be desirable to use security wrenches 210 with GPS transceivers and RFID transceivers, and to use RFID chips in security nuts 140 and/or sockets 160 associated therewith.

Figure 11:
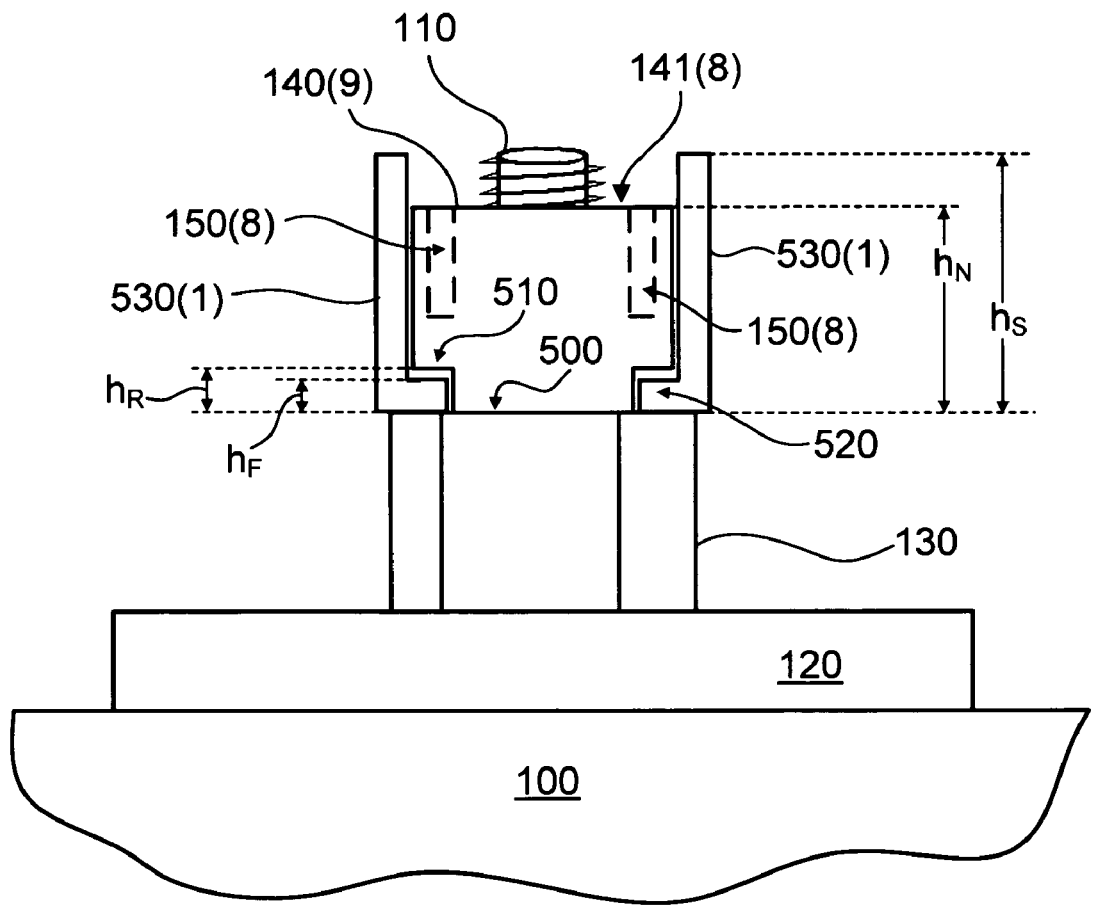
FIG. 11 shows a security nut and an outer sleeve securing a nut to a bolt, in accord with an embodiment.

FIG. 11 is a side view that shows a security nut 140(9) and an outer sleeve 530(1) securing a nut 130 to a bolt 110. FIG. 11 may not be drawn to scale. Each of nut 130, bolt 110, base plate 120 and footing 100 are the same or similar as shown in FIG. 2A, FIG. 2B and FIG. 6A. Security nut 140(9) has grooves 150(8) that mate with protrusions of a security socket (e.g., security nut 140(9) can form a structural bolt security apparatus with any of security sockets 160(1)-160

(4) having corresponding protrusions 150). Outer sleeve 530(1) rests on standard nut 130, as shown, and can rotate freely about security nut 140(9) such that if a tool such as a pipe wrench or pliers is used to rotate outer sleeve 530(1), security nut 140(9) does not rotate. A lower surface 500 of security nut 140(9) forms a recess 510 that accommodates a flange 520 of outer sleeve 530(1); a height $h_R$ of recess 510 is greater than a height $h_F$ of flange 520, so that tightening security nut 140(9) onto standard nut 310 does not bind flange 520 between the two nuts. Outer sleeve 530(1) has a height $h_S$ that is greater than, or about equal to, a height $h_N$ of security nut 140(9), so that outer sleeve 530(1) protects (e.g., limits mechanical access to) security nut 140(9), except at upper surface 141(8).

It is contemplated that opposing surfaces of security nut 140(9) and outer sleeve 530(1) may include low friction surface finishes or coatings to minimize friction therebetween, in order to defeat any attempt to turn nut 140(9) by applying a high force to sleeve 530(1) to crush it against nut 140(9). A lubricant such as oil or grease may also be applied between security nut 140(9) and outer sleeve 530(1) for this purpose.

Figure 12:
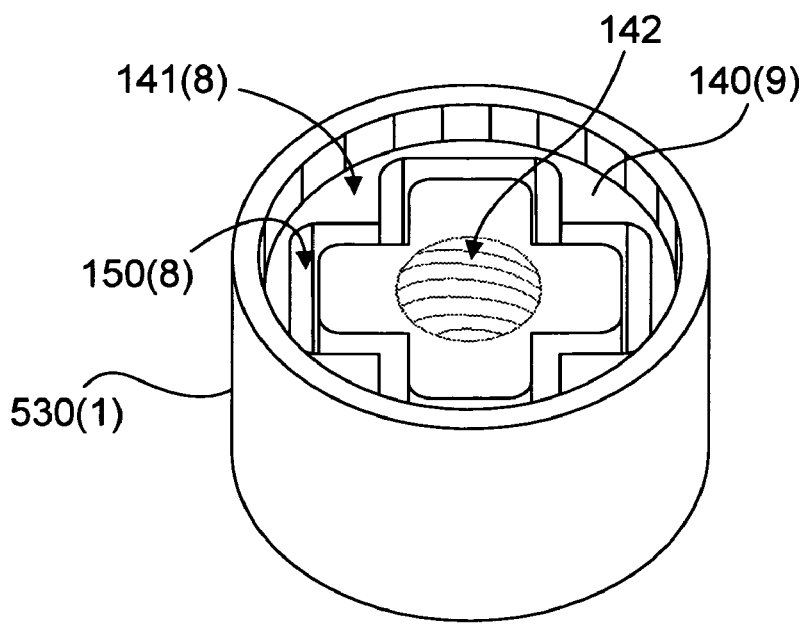
FIG. 12 is a perspective view of the security nut and outer sleeve of FIG. 11.

FIG. 12 is a perspective view of security nut 140(9) and outer sleeve 530(1). FIG. 12 may not be drawn to scale. Security nut 140(9) forms a central threaded hole 142 for a bolt (e.g., bolt 110). Groove 150(8) encircles hole 142. Outer sleeve 530(1) encircles security nut 140(9) and limits access to security nut 140(9) except at upper surface 141(8).

Figure 13A:
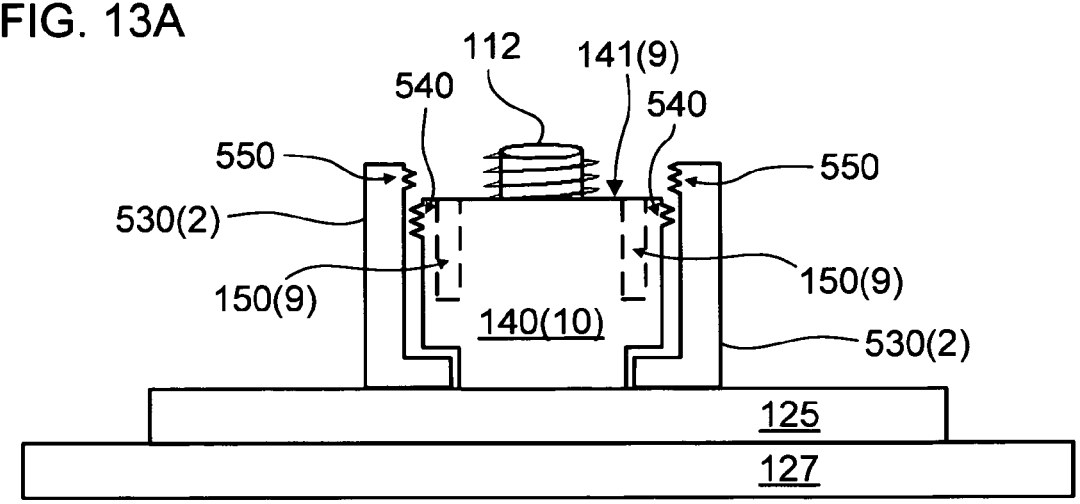
FIG. 13A shows a security nut in a working position relative to an outer sleeve, in accord with an embodiment.

FIG. 13A is a side view that shows a security nut 140(10) in a working position relative to an outer sleeve 530(2). FIG. 13A may not be drawn to scale. Security nut 140(10) secures another mechanical element 125 to mechanical element 127. Bolt 112 is a standard bolt protruding from mechanical element 127. Security nut 140(10) has grooves 150(9) that mate with protrusions of a security socket (e.g., security nut 140(10) can form a structural bolt security apparatus with any of security sockets 160(1)-160(4) having corresponding protrusions 150). Outer sleeve 530(2) rests on mechanical element 125, as shown, and can rotate freely about security nut 140(10) in the same fashion that outer sleeve 530(1) can rotate about security nut 140(9) discussed above in reference to FIG. 1. Security nut 140(10) includes threads 540 that can engage threads 550 of outer sleeve 530(2) at a standoff position (illustrated in FIG. 13B). Threads 540 and 550 allow outer sleeve 530(2) to couple with security nut 140 (10) so that sleeve 530(2) and nut 140(10) do not easily separate (e.g., for convenience during shipping and handling), but sleeve 530(2) and nut 140(10) mechanically decouple when nut 140(10) is in the working position shown in FIG. 13A.

Figure 13B:
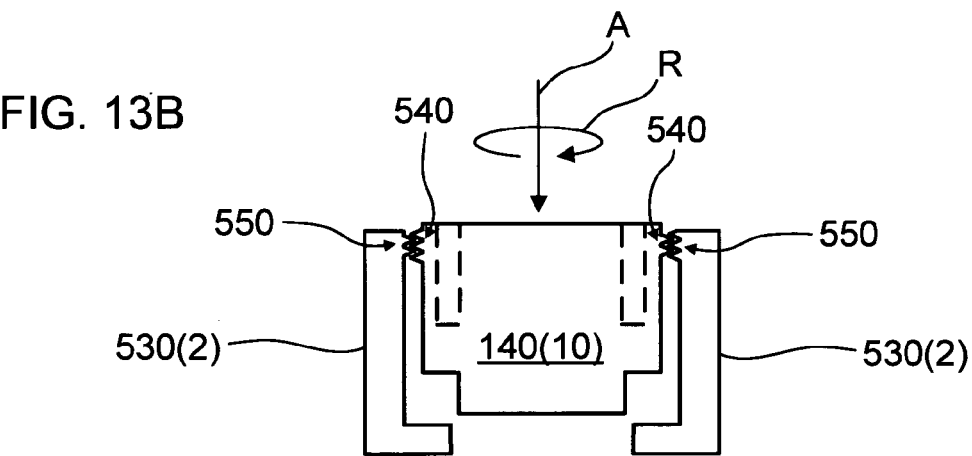
FIG. 13B shows the security nut and outer sleeve of FIG. 13A in a standoff position.

FIG. 13B shows security nut 140(10) in a standoff position relative to outer sleeve 530(2). FIG. 13B may not be drawn to scale. In the standoff position, threads 540 engage threads 550. Rotating security nut 140(10) in the direction of arrow R relative to outer sleeve 530(2) advances nut 140(10) in the direction of arrow A. Security nut 140(10) can thus screw into outer sleeve 530(2) until threads 540 clear threads 550, so that nut 140(10) can assume the working position relative to sleeve 530(2). The working position is shown in FIG. 13A.

Figure 14:
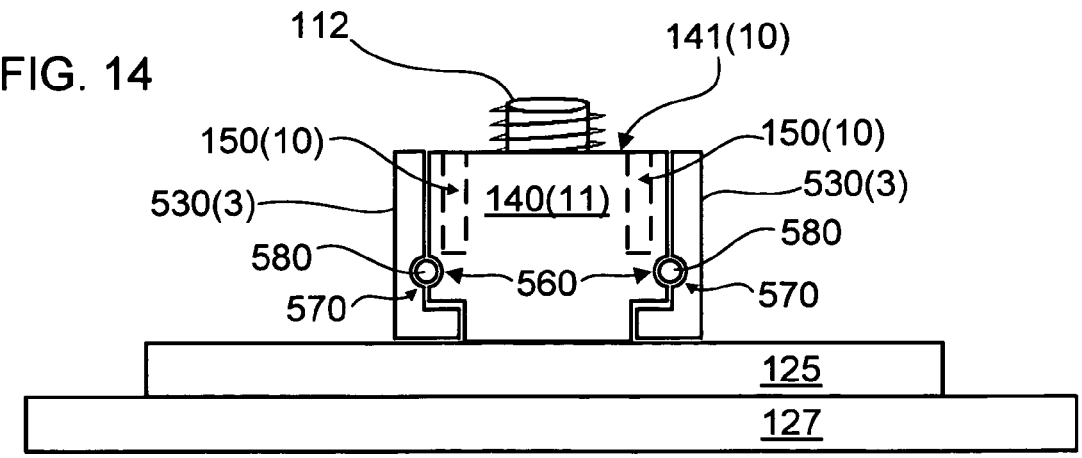
FIG. 14 shows a security nut that secures a nut to a bolt, in accord with an embodiment.

FIG. 14 is a side view that shows a security nut 140(11) that secures a mechanical element 125 to a bolt 112. FIG. 14 may not be drawn to scale. Each of bolt 112 and mechanical elements 125 and 127 are the same or similar as shown in FIG. 13A. Security nut 140(11) has grooves 150(10) that mate with protrusions of a security socket (e.g., security nut 140(11) can form a structural bolt security apparatus with any of security sockets 160(1)-160(4) having corresponding protrusions 150). An outer sleeve 530(3) rests on mechanical element 125, as shown, and can rotate freely about security nut 140(11) in the same fashion that outer sleeve 530(1)-530(2) can rotate about security nuts 140(9)-140(10), respectively. Security nut 140(11) includes a groove 560, and outer sleeve 530(3) includes a groove 570; grooves 560 and 570 form a track that holds ball bearings 580, as shown. Grooves 560 and 570 and ball bearings 580 cooperate so that sleeve 530(3) and nut 140(11) do not easily separate (e.g., for convenience during shipping and handling). Ball bearings 580 may also promote sleeve 530(3) turning independently of nut 140(11) if, for example, sleeve 530(3) is subjected to high forces in an attempt to crush sleeve 530(3) against nut 140(11).

Figure 15A:
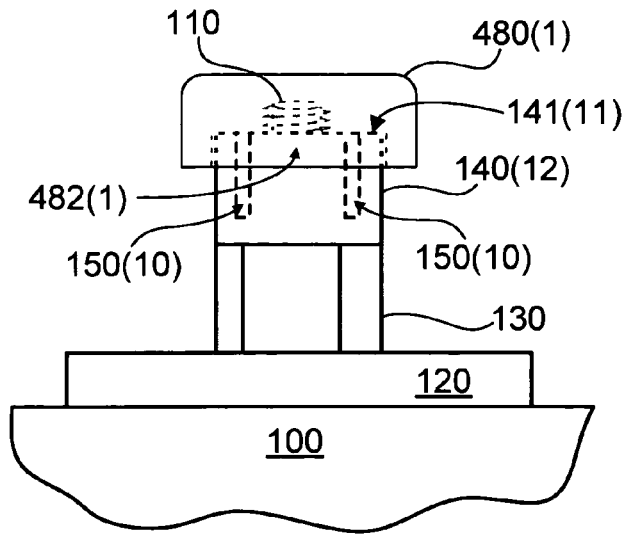
FIG. 15A shows a protective cap for protecting a security nut, in accord with an embodiment.
Figure 15B:
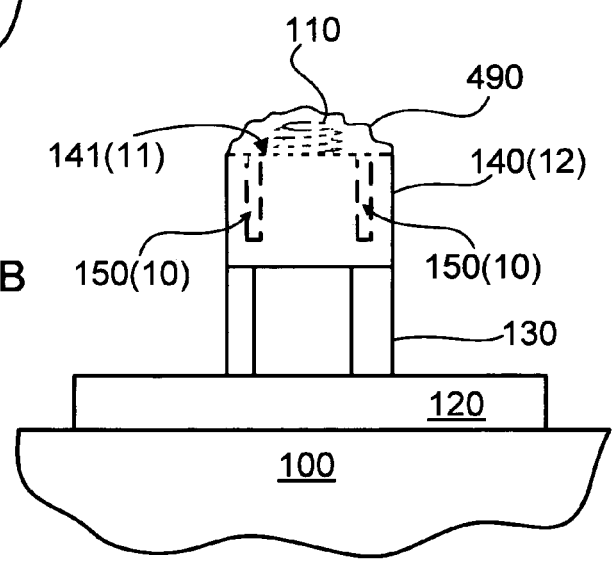
FIG. 15B shows protective material for protecting a security nut, in accord with an embodiment.

FIG. 15A and FIG. 15B illustrate a cap 480 and a protective material 490, respectively, protecting a security nut 140(12). FIG. 15A and FIG. 15B may not be drawn to scale. As in other embodiments disclosed herein, security nut 140(12) threads over a bolt 110 to secure a standard nut 130 that, in turn, secures a baseplate 120 to a footing 100. Security nut 140(12) has an upper surface 141(11) with grooves 150(10) to engage protrusions of a security socket (e.g., any of security sockets 160(1)-160(4)). As shown in FIG. 15A and FIG. 15B, grooves 150(10) may be in an upwardly exposed position; if unprotected, contamination such as dirt and/or water may accumulate within grooves 150(10), such that security nut 140(12) may incur damage due to freezing and thawing, corrosion, or dirt that interferes with intended operation of a corresponding security socket.

FIG. 15A shows a protective cap 480(1) for protecting security nut 140(12). Cap 480(1) forms a recess 482(1), such that security nut 140(12) fits into recess 482(1) when cap 480(1) is installed over security nut 140(12) and a bolt 110. Although FIG. 15A shows recess 482(1) of cap 480(1) as deep enough to cover only part of nut 140(12), it is appreciated that cap 480(1) may be large enough and recess 482 may be deep enough to cover all of nut 140(12), and/or part or all of standard nut 130. Cap 480(1) may include an internally threaded portion to engage threads of bolt 110. (In other embodiments, protective caps like cap 480(1) may include an externally threaded portion to engage threads of a security nut in case a corresponding bolt is not long enough to protrude through the nut.) Cap 480(1) may be made, for example, of metal, plastic, rubber, or combinations thereof (e.g., a metal cap with a rubber seal that conforms to upper surface 141(11) or an outer perimeter of security nut 140 (12)).

FIG. 15B shows a protective material 490 for protecting security nut 140(9). Material 490 may be a material such as rubber or plastic that can be applied conformally in a liquid form (or other non-solid forms, such as caulk or gel); material 490 may harden into a pliable solid form after application so that it can be removed from security nut 140(9). Although FIG. 15B shows material 490 covering only bolt 110 and upper surface 141(9) of security nut 140(9), it is appreciated that material 140(9) may be applied to other surfaces of security nut 140(9), standard nut 130, and/or baseplate 120. An undercoating (such as, for example, a rust inhibitor and/or a release agent) may be applied to bolt 0.110 and/or upper surface 141(9) of security nut 140(9) before protective material 490 is applied.

Figure 15C:
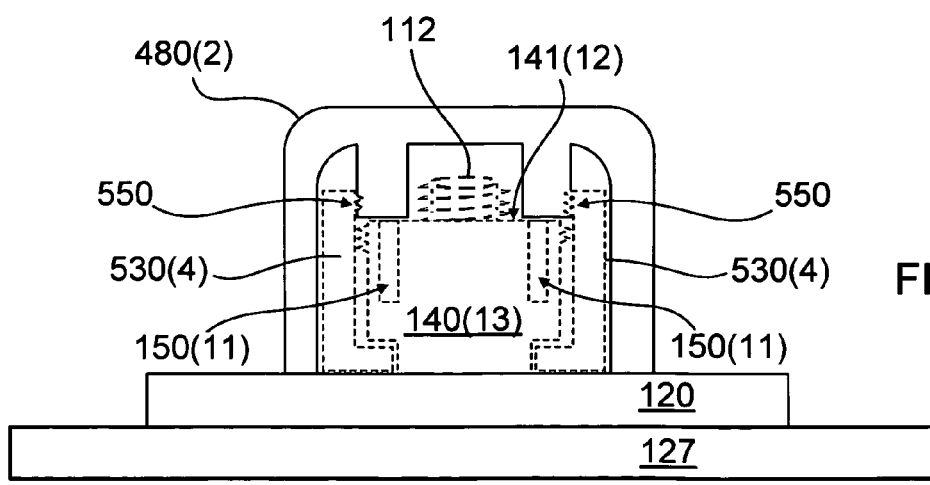
FIG. 15C shows a protective cap for protecting a security nut, in accord with an embodiment.

FIG. 15C illustrates a cap 480(2) that protects a security nut 140(13) and a standard bolt 112. FIG. 15C may not be drawn to scale. As in other embodiments disclosed herein, security nut 140(13) threads over bolt 112 to secure a mechanical element 125 to another mechanical element 127.

Security nut 140(13) has an upper surface 141(12) with grooves 150(11) to engage protrusions of a security socket (e.g., any of security sockets 160(1)-160(4)). Grooves 150 (11) may be in an upwardly exposed position; that could allow contamination such as dirt and/or water to accumulate within grooves 150(11) and damage security nut 140(13). An outer sleeve 530(4) encircles security nut 140(13) to protect it from being turned with tools such as a pipe wrench or pliers. Cap 480(2) includes an externally threaded portion that engages threads 550 of outer sleeve 530(4).

In other embodiments, protective caps like cap 480(1) or 480(2) may include flanges or recesses that engage physical features of corresponding security nuts or standard nuts or bolts to keep the protective cap in place. Protective caps may be made, for example, of metal, plastic, rubber, or combinations thereof (e.g., a metal cap with a rubber seal that conforms to an upper surface or an outer perimeter of a security nut).

Although explicit reference has been made to use of the structural bolt security apparatus 10 with transmission towers 5, it will be understood that certain embodiments may be used in the construction of numerous structures including, but not limited to communication towers, electrical transmission towers, electrical equipment supports, mechanical equipment supports, lighting towers, signal towers, telephone towers, water towers, radar towers, petroleum pipeline supports, gas pipeline supports, water transmission structures, nuclear reactors, piping support structures at nuclear plants, cooling towers, advertisement sign supports, traffic signal towers, flagpoles, observation towers, ski lift support towers, gondola support towers, space vehicle launchers, rocket/missile launchers, satellite dish supports, light rail support structures, magnetic rail support structures, and elevator equipment. Other embodiments may be utilized in any application where security is of concern; for example to secure vehicle wheels to hubs, or to secure other articles where security and/or vandalism may be of concern.

Those skilled in the art appreciate that variations from the specified embodiments disclosed above and shown in the accompanying drawings are contemplated herein and that the embodiments described herein are not limiting. The description should not be restricted to the above embodiments, but should be measured by the following claims.

What is claimed is:

1. A structural bolt security system, comprising:
   a security nut forming a threaded central hole for a bolt, the nut defining a groove that intersects at least one of an upper surface and a side surface of the nut, the nut having an RFID chip;
   a security socket having an RFID chip and a protrusion for engaging the security nut groove; and
   a security wrench for turning the security socket, the security wrench comprising an RFID transceiver and logic electronics configured to disable the security wrench except in the presence of at least one of the RFID chips.

2. The system of claim 1, the security wrench being disabled except in the presence of both the security nut RFID chip and the security socket RFID chip.

3. The system of claim 1, further comprising a protective cap for the security nut to keep contamination out of the groove.

4. The system of claim 3, the protective cap forming threads to engage at least one of the bolt and the security nut.

5. The system of claim 1, further comprising a protective material applied conformally to the security nut.

6. The system of claim 1, the security wrench comprising a GPS transceiver for broadcasting security wrench position information.

7. A structural bolt security apparatus, comprising a security nut having a plurality of electrical contacts and forming a threaded central hole for a bolt, the security nut having logic electronics configured for monitoring electrical resistance across the electrical contacts, the security nut having a transmitter for broadcasting security data generated by the logic electronics.

8. The structural bolt security apparatus of claim 7, wherein at least one of the electrical contacts is at an upper surface of a thread of the nut.

9. The structural bolt security apparatus of claim 7, further comprising relay electronics separate from the security nut for receiving the security data and for transmitting the security data to other relay electronics.

10. A structural bolt security system, comprising:
    a security nut forming a threaded central hole for engaging a bolt, the security nut forming a groove that intersects at least one of an upper surface and a side surface of the nut; and
    a security wrench, comprising:
      a security socket having a protrusion for engaging the security nut groove, and
      a GPS transceiver for broadcasting security wrench position information.

11. The structural bolt security system of claim 10, wherein the security nut includes:
    a plurality of electrical contacts;
    logic electronics configured for monitoring electrical resistance across the electrical contacts of the nut and generating security data; and
    a transmitter for broadcasting the security data generated by the logic electronics.

12. The structural bolt security system of claim 10, wherein at least one of the electrical contacts is formed in an upper surface of a thread of the nut.

13. The structural bolt security system of claim 10, wherein at least one of the electrical contacts is formed in a lower surface of a thread of the nut.

14. The structural bolt security system of claim 10 further comprising relay electronics for receiving the security data and for transmitting the security data to other relay electronics.

15. A structural bolt security apparatus, comprising:
    a security nut defining a threaded central through hole for engaging a bolt, the security nut forming a groove that intersects an upper surface of the nut, the groove being separated from the through hole and a side surface of the nut, the security nut having a bottom surface that defines a recess; and
    an outer sleeve that has a height greater than or about equal to a height of the security nut, the outer sleeve having a flange, the flange having a height less than a height of the recess, the flange being disposed in the recess so that the outer sleeve rotates freely about the security nut.

16. The apparatus of claim 15, further comprising a security socket having a protrusion to engage the security nut groove.

17. A structural bolt security apparatus, comprising:
    a security nut defining a threaded central hole for engaging a bolt, the security nut forming a groove that intersects an upper surface of the nut, the security nut having a bottom surface that defines a recess; and an outer sleeve that has a height greater than or about equal to a height of the security nut, the outer sleeve having a flange, the flange having a height less than a height of the recess, the flange being disposed in the recess so that the outer sleeve rotates freely about the security nut;

wherein the security nut forms external threads and the outer sleeve forms internal threads, such that the external and internal threads engage in a standoff position and disengage in a working position.

18. The apparatus of claim 15, wherein:
the security nut and the outer sleeve form opposing grooves; and
at least one ball bearing is disposed inside the opposing grooves.

19. The apparatus of claim 15, wherein at least one of the security nut and the outer sleeve includes a low friction surface finish.

20. The apparatus of claim 15, wherein at least one of the security nut and the outer sleeve includes a low friction coating.

21. The apparatus of claim 15, further comprising lubricant disposed between the security nut and the outer sleeve.

22. The apparatus of claim 15, further comprising a protective cap for the security nut to keep contamination out of grooves.

23. A structural bolt security apparatus, comprising:
a security nut defining a threaded central hole for engaging a bolt, the security nut forming a groove that intersects an upper surface of the nut, the security nut having a bottom surface that defines a recess;
an outer sleeve that has a height greater than or about equal to a height of the security nut, the outer sleeve having a flange, the flange having a height less than a height of the recess, the flange being disposed in the recess so that the outer sleeve rotates freely about the security nut; and
a protective cap for the security nut to keep contamination out of grooves;
wherein the protective cap defines threads for engaging at least one of the bolt, the security nut, and the outer sleeve.

24. A structural bolt security apparatus, comprising:
a security nut defining a threaded central hole for engaging a bolt, the security nut forming a groove that intersects an upper surface of the nut, the security nut having a bottom surface that defines a recess;
an outer sleeve that has a height greater than or about equal to a height of the security nut the outer sleeve having a flange, the flange having a height less than a height of the recess, the flange being disposed in the recess so that the outer sleeve rotates freely about the security nut; and
a protective material applied conformally to the security nut.

25. A structural bolt security apparatus, comprising:
a security nut defining a threaded central hole for engaging a bolt, the security nut forming a groove that intersects an upper surface of the nut, the security nut having a bottom surface that defines a recess; and
an outer sleeve that has a height greater than or about equal to a height of the security nut, the outer sleeve having a flange, the flange having a height less than a height of the recess, the flange being disposed in the recess so that the outer sleeve rotates freely about the security nut; and
a security socket having a protrusion to engage the security nut groove;
wherein the security nut has an RFID chip;
wherein the security socket has an RFID chip; and
wherein the apparatus further comprises a security wrench for turning the security socket, the security wrench comprising an RFID transceiver and logic electronics configured to disable the security wrench except in the presence of at least one of the RFID chips.

26. The apparatus of claim 25, wherein the security wrench is disabled except in the presence of both the security nut RFID chip and the security socket RFID chip.

27. The apparatus of claim 25, wherein the security wrench includes a GPS transceiver for broadcasting security wrench position information.

28. A structural bolt security apparatus, comprising:
a security nut defining a threaded central hole for engaging a bolt, the security nut forming a groove that intersects an upper surface of the nut, the security nut having a bottom surface that defines a recess; and
an outer sleeve that has a height greater than or about equal to a height of the security nut, the outer sleeve having a flange, the flange having a height less than a height of the recess, the flange being disposed in the recess so that the outer sleeve rotates freely about the security nut;
wherein the security nut has a plurality of electrical contacts;
wherein the security nut has logic electronics configured for monitoring electrical resistance across the electrical contacts; and
wherein the security nut has a transmitter for broadcasting security data generated by the logic electronics.

* * * * *